(12) United States Patent
Hasebe et al.

(10) Patent No.: US 7,108,282 B2
(45) Date of Patent: Sep. 19, 2006

(54) AIRBAG DEVICE AND AIRBAG

(75) Inventors: Masahiro Hasebe, Shiga (JP);
Yukitoshi Narimoto, Omihachiman (JP)

(73) Assignee: Takata Corporation, Tokyo (JP)

( * ) Notice: Subject to any disclaimer, the term of this patent is extended or adjusted under 35 U.S.C. 154(b) by 190 days.

(21) Appl. No.: 10/771,364

(22) Filed: Feb. 5, 2004

(65) Prior Publication Data

US 2004/0160041 A1    Aug. 19, 2004

Related U.S. Application Data

(63) Continuation-in-part of application No. 10/693,101, filed on Oct. 27, 2003, now Pat. No. 6,834,886.

(30) Foreign Application Priority Data

Feb. 18, 2003  (JP) .............................. 2003-039895
Dec. 11, 2003  (JP) .............................. 2003-413505

(51) Int. Cl.
   *B60R 21/16*    (2006.01)
(52) U.S. Cl. .................................... 280/743.1
(58) Field of Classification Search ............. 280/743.1, 280/730.1, 728.2, 731, 732
   See application file for complete search history.

(56) References Cited

U.S. PATENT DOCUMENTS

| 3,879,057 | A | * | 4/1975 | Kawashima et al. | ..... | 280/743.2 |
| 5,125,682 | A | * | 6/1992 | Hensler et al. | .......... | 280/730.1 |
| 5,213,361 | A | | 5/1993 | Satoh et al. | | |
| 5,934,701 | A | | 8/1999 | Furukawa | | |
| 6,505,851 | B1 | * | 1/2003 | Frisch | ..................... | 280/728.3 |
| 6,536,801 | B1 | * | 3/2003 | Frisch | ..................... | 280/743.1 |
| 6,540,254 | B1 | * | 4/2003 | Bieber et al. | ................ | 280/732 |
| 6,554,317 | B1 | * | 4/2003 | Lorenz et al. | ........... | 280/743.1 |
| 6,588,798 | B1 | * | 7/2003 | Bohn et al. | .............. | 280/743.1 |
| 6,595,549 | B1 | * | 7/2003 | Bohn et al. | .............. | 280/743.1 |
| 6,726,245 | B1 | * | 4/2004 | Fellhauer et al. | ........ | 280/743.2 |
| 6,802,534 | B1 | | 10/2004 | Neupert | | |
| 2002/0084631 | A1 | * | 7/2002 | Lorenz et al. | ........... | 280/728.2 |
| 2002/0084638 | A1 | * | 7/2002 | Neupert | .................... | 280/743.1 |
| 2002/0084640 | A1 | * | 7/2002 | Bohn | ...................... | 280/743.1 |
| 2002/0084641 | A1 | * | 7/2002 | Fellhauer et al. | ........ | 280/743.1 |
| 2002/0195809 | A1 | * | 12/2002 | Bieber et al. | ............ | 280/743.1 |
| 2003/0218325 | A1 | * | 11/2003 | Hasebe et al. | ............ | 280/743.2 |
| 2003/0230883 | A1 | * | 12/2003 | Heym | ...................... | 280/743.1 |

FOREIGN PATENT DOCUMENTS

JP          49023176 B       6/1974
JP          4-292239         10/1992

* cited by examiner

*Primary Examiner*—Faye M. Fleming
(74) *Attorney, Agent, or Firm*—Manabu Kanesaka

(57) ABSTRACT

An airbag device has an airbag and an inflator for inflating the airbag. The inflator disposed at a base side of the airbag ejects gas to inflate the airbag such that a distal end of the airbag moves away from the base side of the airbag. The airbag includes a left half airbag to be inflated at a front left side of a vehicle occupant and a right half airbag to be inflated at the front right side of the occupant. Distal ends of the left and right half airbags are separated by a space facing the occupant when the airbag is inflated. Each half airbag has a belt for connecting panels for each half airbag to restrict width thereof. The left and right half airbags have primary folded portions having vertically elongated folded states and secondary folded portions having vertically folded states to form a finally folded state.

18 Claims, 20 Drawing Sheets

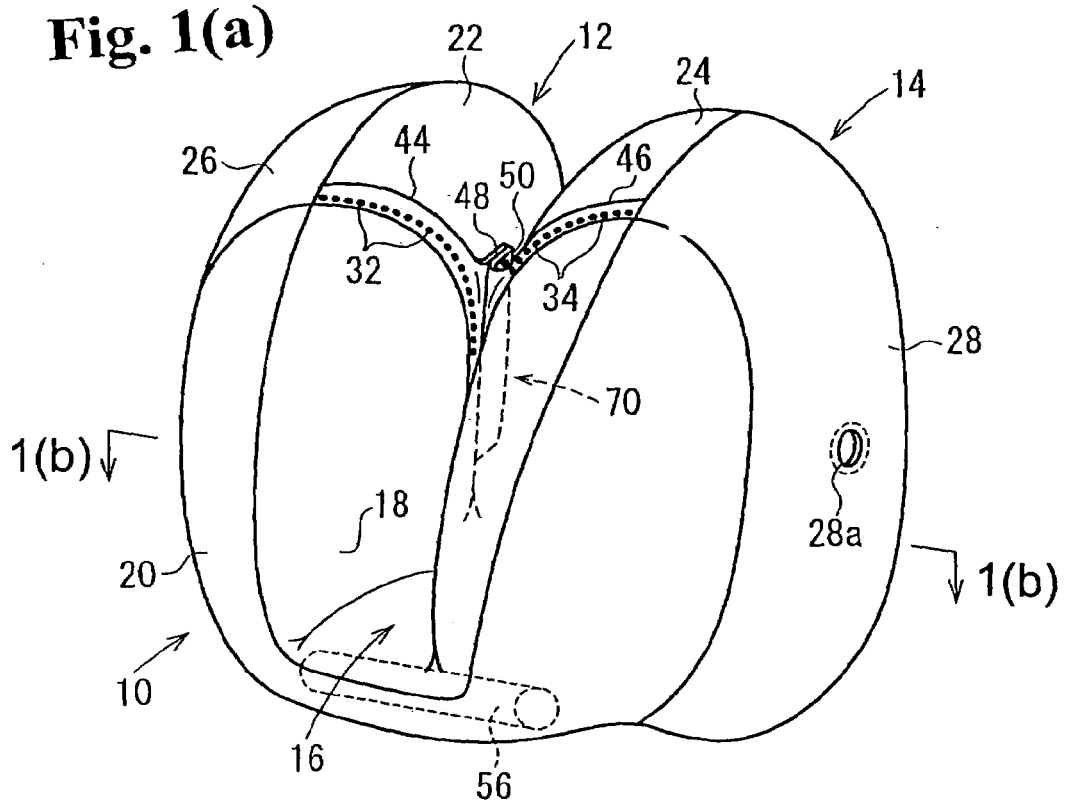
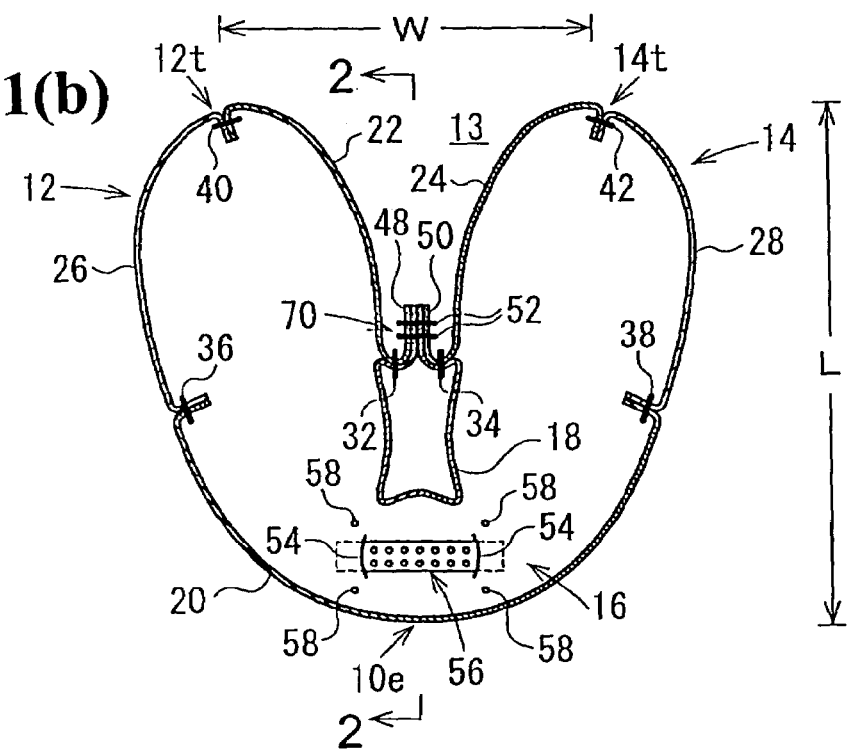

Fig. 12
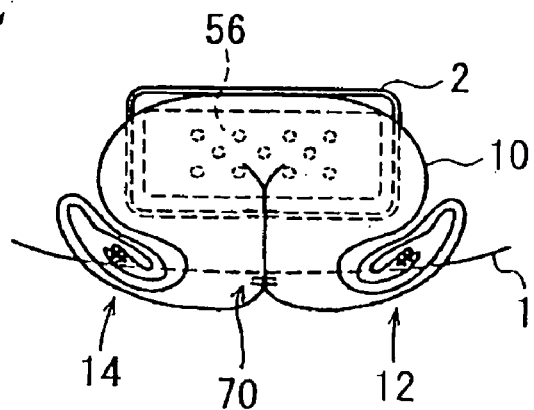
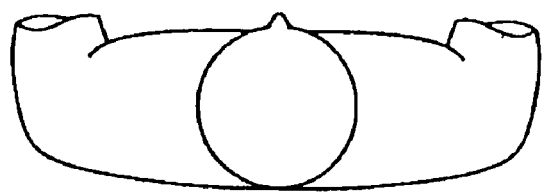
Fig. 13
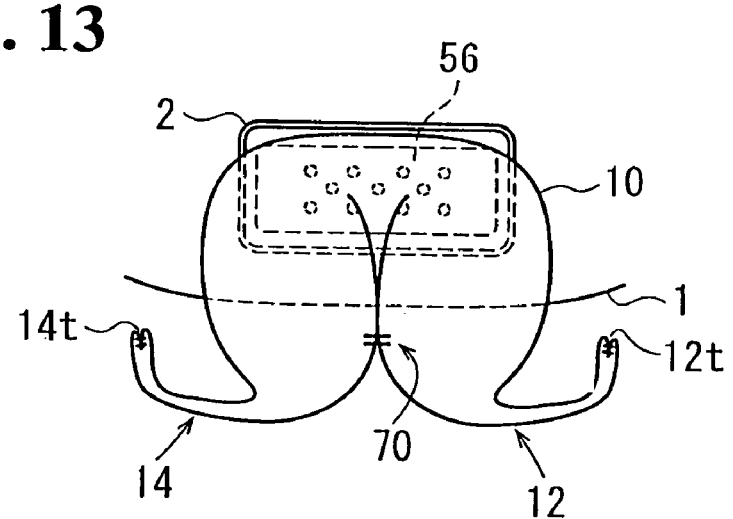
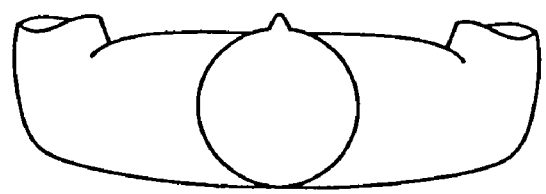

Fig. 15
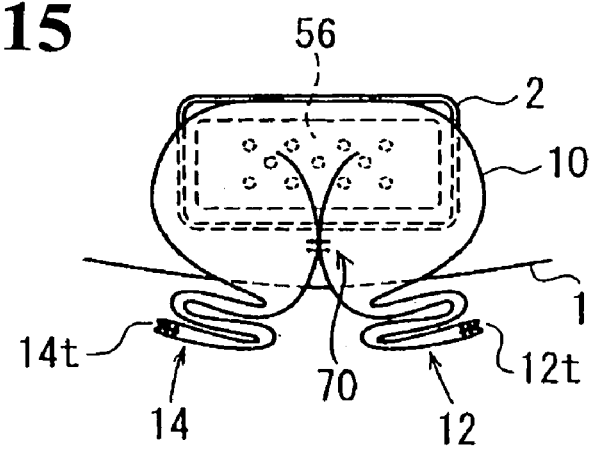
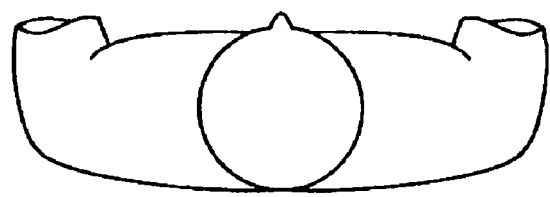
Fig. 16
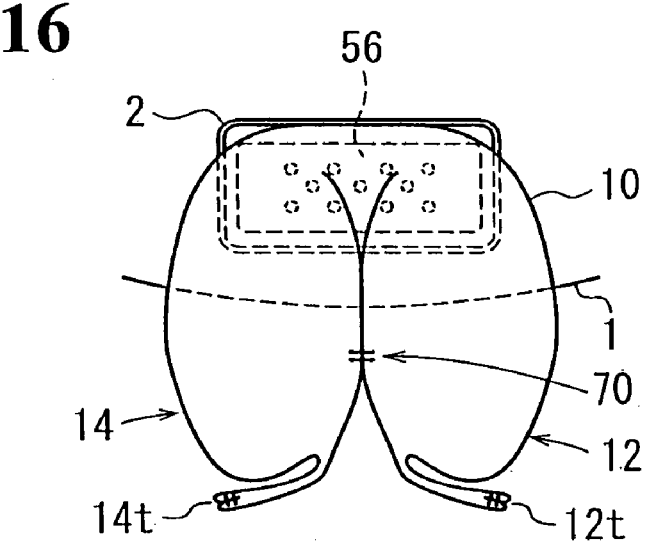
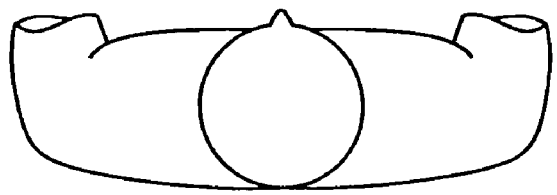

position of lower end of connecting belt about 50mm folding toward windshield rolling three times along lines F folding at center of connecting belt along line G folding along line H at passenger side rolling three times along lines I

US 7,108,282 B2

AIRBAG DEVICE AND AIRBAG

CROSS REFERENCE TO RELATED APPLICATION

This is a continuation-in-part application of patent application Ser. No. 10/693,101 filed on Oct. 27, 2003 now U.S. Pat. No. 6,834,886.

BACKGROUND OF THE INVENTION AND RELATED ART STATEMENT

The present invention relates to an airbag and an airbag device for protecting an occupant in the event of, for example, a vehicle collision. In particular, the present invention relates to an airbag having left and right half airbags to be inflated at front left and front right sides of the occupant, respectively and an airbag device including the airbag.

Japanese Patent Publication (Kokai) No. 04-292239 has disclosed an airbag for protecting a vehicle occupant in the event of a vehicle collision. The airbag has a left half airbag to be inflated at a front left side of the occupant, and a right half airbag to be inflated at a front right side of the occupant. A common inflator inflates both the left half and right half airbags. In the airbag, a distal end of the left half airbag is connected to a distal end of the right half airbag with a tie panel.

The airbag is folded in a case and covered with a cover. In the event of a vehicle collision, the inflator, i.e. a gas generator, ejects gas to inflate the airbag rapidly in front of the occupant by pushing and opening the cover.

The inflator is disposed at an inside or outside of a base portion of the airbag. In an airbag device having an inflator disposed at an outside of the base portion of the airbag, the gas from the inflator is supplied into the airbag through a gas inlet disposed at the base portion side of the airbag. In an airbag device having an inflator disposed at an inside of the base portion side of the airbag, the inflator is entirely or partially disposed in the airbag. An example of the latter case includes a configuration in which a pair of slit openings is formed in the airbag, and a rod inflator passes through the slit openings, so that both ends of the inflator expose at the outside of the airbag.

In the airbag disclosed in Japanese Patent Publication (Kokai) No. 04-292239, the distal ends of the left half and right half airbags are connected with the tie panel. Therefore, when the airbag is inflated, the tie panel receives a center part of the vehicle occupant body in the lateral direction. When the left half and right half airbags are inflated, a larger amount of the gas may flow in one of the half airbags from the inflator, and then the other of the half airbags may be inflated later than the one of the half airbags. As described above, the distal ends of the left and right half airbags are connected with the tie panel. Accordingly, it is expected that when one of the half airbags is inflated faster than the other, the one of the half airbags may facilitate the other of the half airbags to be inflated by pulling the other of the half airbags through the tie panel.

As described above, however, the tie panel connects the distal ends of the left and right half airbags. Therefore, the one of the half airbags does not sufficiently pull the other of the half airbags through the tie panel until the one of the half airbags is inflated up to the distal end.

In view of the problem described above, an object of the present invention is to provide an airbag device including left and right half airbags for receiving the left and right sides of the occupant thorax, and a space between the inflated half airbags faces a center part of the occupant thorax in a horizontal direction.

Another object of the present invention is to provide an airbag and an airbag device, wherein the left half airbag and the right half airbag are inflated smoothly and substantially uniformly toward left and right sides from an early stage of the inflation.

Further objects and advantages of the invention will be apparent from the following description of the invention.

SUMMARY OF THE INVENTION

According to the present invention, an airbag device has an airbag in a folded state and an inflator for inflating the airbag. The inflator disposed at a base side of the airbag ejects gas to inflate the airbag such that a distal end of the airbag moves away from the base side of the airbag. The airbag includes a left half airbag to be inflated at a front left side of a vehicle occupant and a right half airbag to be inflated at the front right side of the occupant. Distal ends of the left and right half airbags are separated by a space facing the occupant when the airbag is inflated. The left and right half airbags have primary folded portions having vertically elongated folded states, which are then folded to have secondary folded portions having small vertically folded states to form a final folded state.

According to the present invention, at least a part of the primary folded portion may have a rolled up portion. The rolled up portion of the left half airbag is rolled up clockwise, and the rolled up portion of the right half airbag is rolled up counterclockwise viewed from above.

According to the present invention, the primary folded portions of the airbag may be folded into bellows. Also, the secondary folded portions may be separately formed at top and bottom halves of the primary folded portion. The top half of the secondary folded portion may have a size larger than that of the bottom half of the secondary folded portion.

According to the present invention, the left and right half airbags may be communicated together at base portions, and a common inflator may be provided for ejecting the gas to inflate the left and right half airbags. Also, the left and right half airbags may be connected with a connecting portion at midsections thereof in a direction that the airbag is inflated.

According to the present invention, when the primary folded portions are formed, the distal portions of the left and right half airbags from the connecting portion may be folded in opposite directions along first fold lines on the connecting portion in a vertical direction. The base portions of the left and right half airbags from the first fold lines may be folded along third fold lines between the connecting portion and the bases of the left and right half airbags such that the second fold lines move away from each other. The second fold lines between the third fold lines and the bases of the left and right half airbags are overlapped with the first fold lines. The distal portions from the second fold lines are overlapped with each other and rolled up. The base portions from the second fold lines are folded into bellows.

According to the present invention, a belt may be provided between panels of the left and right half airbags for restricting a width in the right-to-left direction of each of the left and right half airbags when the airbag is inflated. The left and right half airbags may be connected at midsections of opposing portions thereof in a direction that the airbag is inflated with a connecting member extending in a direction that the left and right half airbags are connected. When the airbag is inflated, the belt and the connecting member are arranged linearly. The connecting member may be formed in a panel shape, and the belt may be formed in a belt shape. When the airbag is inflated, surfaces of the connecting member and the belts may be arranged vertically on the same plane.

According to another aspect of the present invention, an airbag is inflated with an inflator disposed at a base side of the airbag such that a distal end of the airbag moves away from the base side of the airbag. The airbag includes a left half airbag to be inflated at a front left side of a vehicle occupant and a right half airbag to be inflated at the front right side of the occupant. The distal ends of the left and right half airbags are not connected, and in the airbag inflating condition, a space opening toward the occupant is formed between the distal ends of the left and right half airbags. Opposing panels of the left and right half airbags are connected with a belt so that a width in the right-to-left direction of each of the left and right half airbags is restricted when the airbag is inflated. The belt has a surface extending vertically when the airbag is inflated.

According to the present invention, the left and right half airbags may be connected at midsections of opposing portions thereof in a direction that the airbag is inflated with a connecting member extending in a direction that the left and right half airbags are connected. The connecting member may be formed in a panel shape. When the airbag is inflated, the belts and the connecting member are arranged linearly, and belt surfaces of the belts and the panel surface of the connecting member may be located on a same plane. An airbag apparatus of the invention is provided with the above airbag.

In the present invention, when the inflator inflates the airbag, the left and right half airbags receive the left and right sides of the occupant thorax having hard and strong ribs. The airbag receives and absorbs an impact from the occupant through the ribs. The inflated airbag has the space between the distal ends of the left and right half airbags. The space faces the occupant around breastbone in the center of the occupant thorax. Therefore, when the occupant body plunges into the airbag, the breastbone does not receive a large impact from the airbag, thereby reducing a load around the breastbone.

In the present invention, the airbag preferably has a distance of 150 to 450 mm between the distal ends of the left and right half airbags in the inflated state. With this arrangement, the left half airbag faces a left center of the occupant thorax and the right half airbag faces a right center of the occupant thorax, thereby securely receiving the occupant body around the ribs.

In the present invention, the airbag has the primary folded portions having a vertically elongated folded state, which is then folded to have the secondary folded portions in the final folded state. Therefore, in operating the inflator, the left and right half airbags are expanded vertically from a relatively early stage, and then expanded toward the occupant. Accordingly, it is possible to increase a first contact area, i.e. an area of the airbag contacting the occupant first.

In the present invention, at least a part of the primary folded portion has the rolled up portion. The rolled up portion of the left half airbag is rolled up clockwise, and the rolled up portion of the right half airbag is rolled up counterclockwise viewed from above. When the airbag is inflated, the left half airbag is deployed toward the left side of the occupant thorax from the front left side to wrap the left side of the occupant thorax. The right half airbag is deployed toward the right side of the occupant thorax from the front right side to wrap the right side of the occupant thorax. As a result, the airbag wraps and receives the occupant head from the front left and right sides of the occupant.

In the present invention, the primary folded portions of the airbag are folded into bellows. With such an arrangement, the left and right half airbags are deployed toward the front of the occupant to receive the left and right sides of the occupant thorax.

In the present invention, the secondary folded portions are separately formed at top and bottom halves of the primary folded portion. Accordingly, it is possible to adjust sizes of the folded portions at the top and bottom halves of the airbag. For example, when the top half of the secondary folded portion has a size larger than that of the bottom half of the secondary folded portion, the top halves of the left and right half airbags are inflated larger than the bottom halves of the left and right half airbags at the initial stage. As a result, the left and right half airbags approach the occupant with surfaces thereof facing the occupant in a vertical state, thereby increasing the first contact area.

In the present invention, the common inflator may be provided for ejecting the gas to inflate the left and right half airbags. Accordingly, it is possible to reduce the number of the inflators and a production cost.

In the present invention, the left and right half airbags may be connected with the connecting portion at midsections thereof in a direction that the airbag is inflated. With such an arrangement, when one of the half airbags is inflated slower than the other of the half airbags during the inflation, the other of the half airbags pulls the one of the half airbags to facilitate the inflation of the airbag. The left and right half airbags are connected with the connecting portion at the midsections thereof in the direction of the inflation. Accordingly, the other of the half airbags starts to pull the one of the half airbags when the other of the half airbags is inflated up to the midsection from a relatively initial stage of the inflation. As a result, both the left and right half airbags can be inflated smoothly and substantially uniformly from the initial stage of the inflation.

In the present invention, the left and right half airbags may be connected with the connecting portion at the midsections thereof in the direction of the inflation. When the primary folded portions are formed, the distal portions of the left and right half airbags from the connecting portion are folded in opposite directions along the first fold lines on the connecting portion in a vertical direction. The base portions of the left and right half airbags from the first fold lines are folded along the third fold lines between the connecting portion and the bases of the left and right half airbags such that the second fold lines move away from each other. The second fold lines between the third fold lines and the bases of the left and right half airbags are overlapped with the first fold lines. The distal portions from the second fold lines are overlapped with each other and rolled up. The base portions from the second fold lines are folded into bellows.

The primary folded portions have the bellows at the folded base portions from the third fold lines. When the airbag is inflated, the bellows are quickly inflated and then the rolled portions are inflated to wrap the occupant from the front left and right sides.

In the present invention, the belts may be provided between the panels of the left and right half airbags for restricting the width in the right-to-left direction of the left and right half airbags when the airbag is inflated. Accordingly, even if the inflator has a small capacity, it is possible to fully inflate the left and right half airbags at an early stage of the inflation. A length of the belt can be adjusted so that the left and right half airbags have a predetermined width.

In the present invention, the left and right half airbags may be connected with the connecting portion at midsections thereof in a direction that the airbag is inflated. With such an arrangement, when one of the half airbags is inflated slower than the other of the half airbags during the inflation, the other of the half airbags pulls the one of the half airbags to facilitate the inflation of the airbag. Further, the left and right half airbags are connected with the connecting portion at the midsections thereof in the direction of the inflation. Accordingly, the other of the half airbags starts to pull the one of the half airbags when the other of the half airbags is inflated up to the midsection from a relatively initial stage of the inflation. As a result, both the left and right half airbags can be inflated smoothly and substantially uniformly from the initial stage of the inflation.

In the present invention, the left and right half airbags may be connected at midsections of the opposing portions thereof in a direction that the airbag is inflated with the connecting member extending in a direction that the left and right half airbags are connected. Accordingly, it is possible to control a distance between the inflated left and right half airbags by adjusting a length of the connecting member. When the airbag is inflated, the belt and the connecting member are arranged linearly. Accordingly, the left and right half airbags have stable inflated shapes.

In the present invention, the belt may be formed in a belt shape. When the airbag is inflated, the surface of the belt may be arranged on a vertical plane. As compared with a case in which the surface of the belt is arranged on a horizontal plane, it is possible to reduce a stress applied on a joining portion between the belt and each of the left and right half airbags when the airbag is inflated.

Further, the connecting member may be formed in a panel shape. When the airbag is inflated, the surface of the connecting member may be on a vertical plane. As compared with a case in which the surface of the connecting member is arranged on a horizontal plane, it is possible to reduce a stress applied on a joining portion between the connecting member and each of the left and right half airbags when the airbag is inflated. When the surfaces of the connecting member and the belts are arranged on the same plane, it is possible to easily fold the airbag by folding the airbag along the plane when the airbag is folded in the primary folded portions.

BRIEF DESCRIPTION OF THE DRAWINGS

FIGS. 1(a) and 1(b) are views showing a structure of an airbag according to an embodiment of the present invention, wherein FIG. 1(a) is a perspective view of the airbag in an inflated state, and FIG. 1(b) is a sectional view taken along line 1(b)—1(b) in FIG. 1(a);

FIGS. 3(a) and 3(b) are perspective views of the airbag shown in FIG. 1(a), wherein FIG. 3(a) is an exploded perspective view of the airbag, and FIG. 3(b) is an enlarged view of a section 3(b) shown in FIG. 3(a);

FIG. 12 is a plan view showing a process of inflating the airbag shown in FIG. 1(a);

FIG. 13 is a plan view showing the process of inflating the airbag shown in FIG. 1(a);

FIGS. 14(a) and 14(b) are plan views showing the process of inflating the airbag shown in FIG. 1(a), wherein FIG. 14(a) shows a state in which the left and right half airbags contact an occupant, and FIG. 14(b) shows the left and right half airbags in a completely inflated state;

FIG. 15 is a plan view showing a process of inflating an airbag according to another embodiment of the present invention;

FIG. 16 is a plan view showing the process of inflating the airbag shown in FIG. 15;

FIGS. 18(a) and 18(b) are views showing an airbag device according to a further embodiment of the present invention, wherein FIG. 18(a) is a perspective view of a primary folded portion 10B of the airbag having a top half longer than a bottom half, and FIG. 18(b) is a sectional view of the airbag device taken along line 18(b)—18(b) in FIG. 18(a);

FIGS. 22(a) and 22(b) are views showing a structure of an airbag according to a still further embodiment of the present invention, wherein FIG. 22(a) is a perspective view of the airbag in an inflated state, and FIG. 22(b) is a sectional view taken along line 22(b)—22(b) in FIG. 22(a);

FIGS. 24(a) and 24(b) are views for explaining a stress distribution around a connecting portion of a belt in the airbag shown in FIG. 22(a), wherein FIG. 24(a) is a view showing a case that the belt has a surface in a vertical direction, and FIG. 24(b) is a view showing a case that the belt has a surface in a horizontal direction;

DETAILED DESCRIPTION OF PREFERRED EMBODIMENTS

Figure 2:
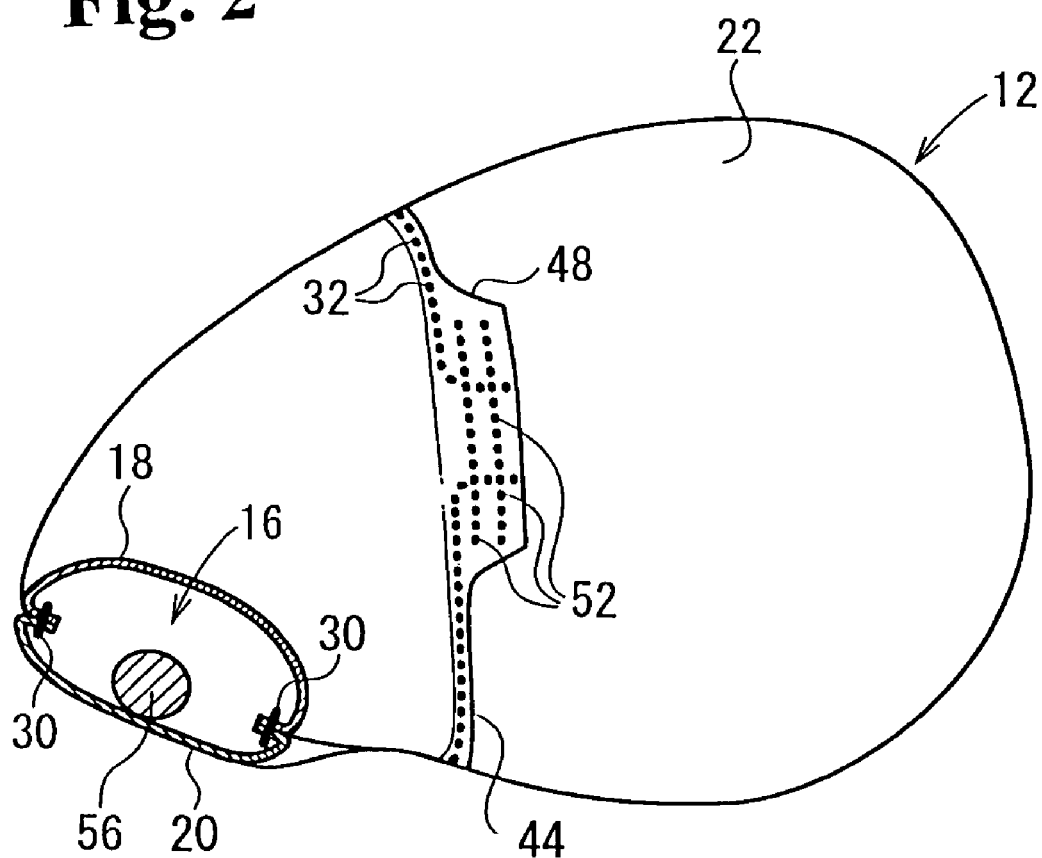
FIG. 2 is a sectional view of the airbag taken along line 2—2 in FIG. 1(b)
Figure 3A:
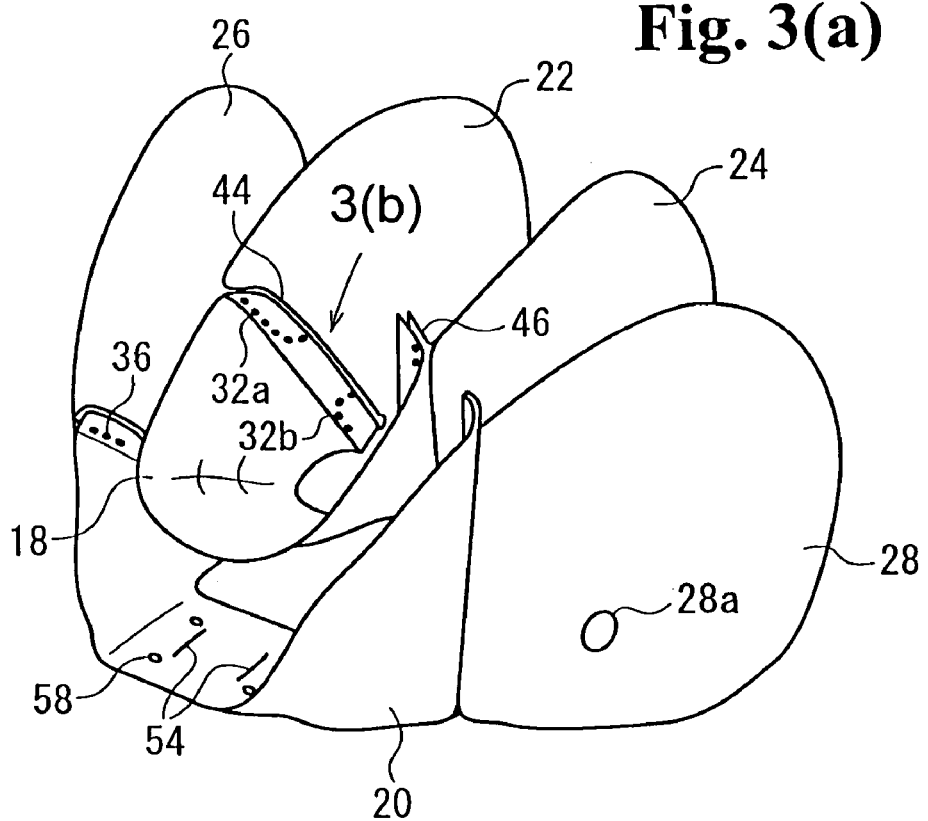
Figure 3B:
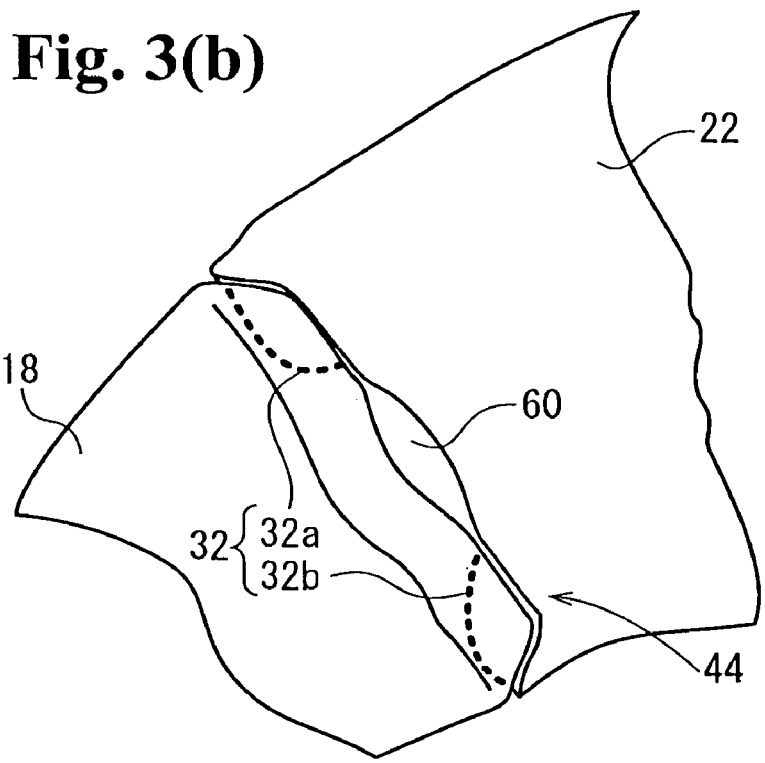

Hereunder, embodiments of the present invention will be described with reference to the accompanying drawings. FIG. 1(a) is a perspective view of an airbag according to an embodiment of the present invention in an inflated state, and FIG. 1(b) is a sectional view taken along line 1(b)—1(b) in FIG. 1(a). FIG. 2 is a sectional view of the airbag taken along line 2—2 in FIG. 1(a). FIGS. 3(a) and 3(b) are perspective views of the airbag shown in FIG. 1(a), wherein FIG. 3(a) is an exploded perspective view of the airbag, and FIG. 3(b) is an enlarged view of a section 3(b) shown in FIG. 3(a).

Figure 14A:
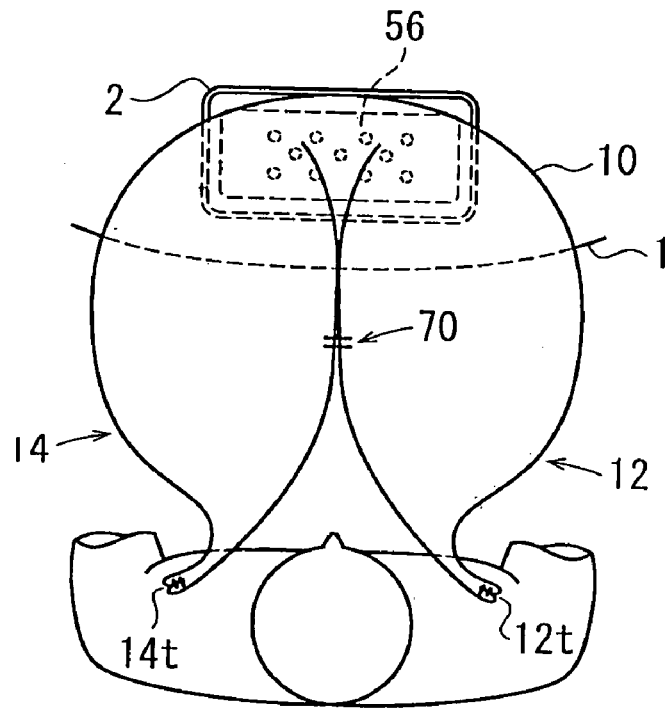
Figure 14B:
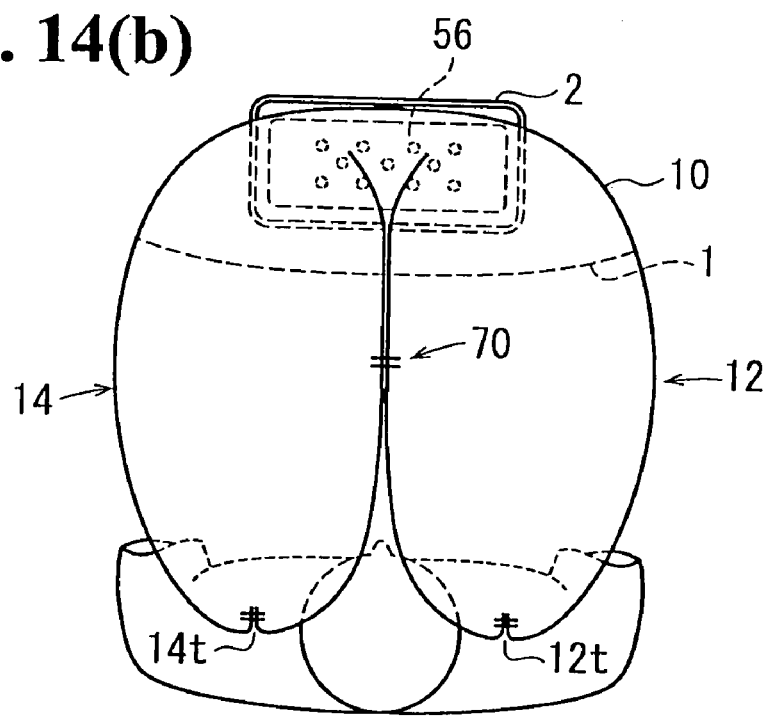

FIGS. 4 to 11 are perspective views showing a process of folding the airbag. FIGS. 12 to 14(a) and 14(b) are views showing a process of inflating the airbag, wherein FIG. 14(a) shows a state in which left and right half airbags contact an occupant, and FIG. 14(b) shows the left and right half airbags in a completely inflated state.

An airbag 10 has a right half airbag 12 to be inflated at the front right side of the occupant, a left half airbag 14 to be inflated at the front left side of the occupant, and a communicating portion 16 for communicating end portions of the right half airbag 12 and the left half airbag 14. The communicating portion 16 forms a base of the airbag 10. Thus, the right half airbag 12 and the left half airbag 14 are inflated away from the communicating portion 16.

When the airbag 10 is inflated, the right half airbag 12 and the left half airbag 14 have distal ends separated by a space 13 facing the occupant (upward in FIG. 1(b)) without a connecting member such as a tie panel therebetween.

When the airbag 10 is inflated, a distal end 12t of the right half airbag 12 is preferably away from a distal end 14t of the left half airbag 14 by a distance W of 150 to 450 mm, more preferably 170 to 430 mm.

The airbag 10 has a connecting portion 70 that connects the right half airbag 12 and the left half airbag 14 with a seam 52 at midsections thereof in a direction that the airbag is inflated. In this embodiment, the airbag 10 includes panels 18, 20, 22, 24, 26, and 28 stitched together. A process of stitching the panels will be described in detail next. As shown in FIG. 3(a), the panel 18 (rear inner panel) constitutes surfaces of the right half airbag 12 and the left half airbag 14 behind the midsections thereof in the direction of the inflation and a center surface of the communicating portion 16. The panel 20 (rear outer panel) constitutes a surface opposite to the rear inner panel 18 (the outer surface of the airbag).

The panels 22 and 24 (front inner panels) constitute inner surfaces of the right half airbag 12 and the left half airbag 14 in front of the midsections thereof in the direction of the inflation (opposing surfaces of the right half airbag 12 and the left half airbag 14). The panels 26 and 28 (front outer panel) constitute surfaces opposite to the front inner panels 22 and 24 (the outer surfaces of the airbag), respectively.

Reference numeral 30 indicates seams (sewing threads) of the rear inner panel 18 and the rear outer panel 20; reference numeral 32 indicates a seam of the rear inner panel 18 and the front inner panel 22; reference numeral 34 indicates a seam of the rear inner panel 18 and the front inner panel 24; reference numeral 36 indicates a seam of the rear outer panel 20 and the front outer panel 26; and reference numeral 38 indicates a seam of the rear outer panel 20 and the front outer panel 28.

A bent hole 28a for the left half airbag is formed in the front outer panel 28. The front outer panel 26 has a bent hole 26a, similar to the bent hole 28a, for the right half airbag (see FIG. 4).

As shown in FIG. 1(a), seam allowances 44 and 46 (joint allowances) between the rear inner panel 18 and the front inner panels 22 and 24 are disposed outside the right half airbag 12 and the left half airbag 14, respectively. As shown in FIGS. 1(a) and 2, the seam allowances 44 and 46 have joint allowances 48 and 50 having a tongue shape, respectively (only the joint allowance 48 is shown in FIG. 2). As shown in FIG. 1(b), seams 52 connect the joint allowances 48 and 50 to form the connecting portion 70.

As described above, the seam allowances 44 and 46 between the rear inner panel 18 and the front inner panels 22 and 24 connect the right half airbag 12 and the left half airbag 14 at the midsections of the opposite surfaces thereof in the direction of the inflation.

In the inflated airbag 10, a distance between a rear end 10e and the connecting portion 70 is preferably about 30% to 70%, more preferably about 40% to 55%, of a front-to-rear length L. The rear outer panel 20 constituting the outer surface of the communicating portion 16 has a pair of slits 54 for holding a rod-shaped inflator 56, as shown in FIGS. 1(a) and 1(b). The slits 54 hold the inflator 56 passing through the communicating portion 16 in the width direction of a vehicle. Both ends of the inflator 56 protrude from the airbag 10.

The airbag 10 is installed in an airbag device for protecting the occupant in case of a vehicle collision. The airbag device has a box case 2 for accommodating the airbag 10 connected to the case 2 (see FIGS. 4 to 11). As shown in FIG. 1(b), fasteners such as bolts (not shown) pass through holes 58 to connect the airbag 10 to the case 2. Both ends of the inflator 56 are disposed inside the case 2.

In the airbag device, the airbag 10 is folded and accommodated in the case 2, and a cover such as a lid (not shown) covers the folded airbag. When the airbag 10 is inflated, the airbag 10 pushes and breaks the lid to open. The airbag device is installed on a top surface of an instrument panel 1 in front of a passenger seat in the vehicle (see FIGS. 12 to 14(a) and 14(b)).

A process of folding the airbag 10 will be described with reference to FIGS. 4 to 11. For the sake of the description, views in FIGS. 8 to 11 are enlarged about 1.2 times larger than views in FIGS. 4 to 7.

Figure 4:
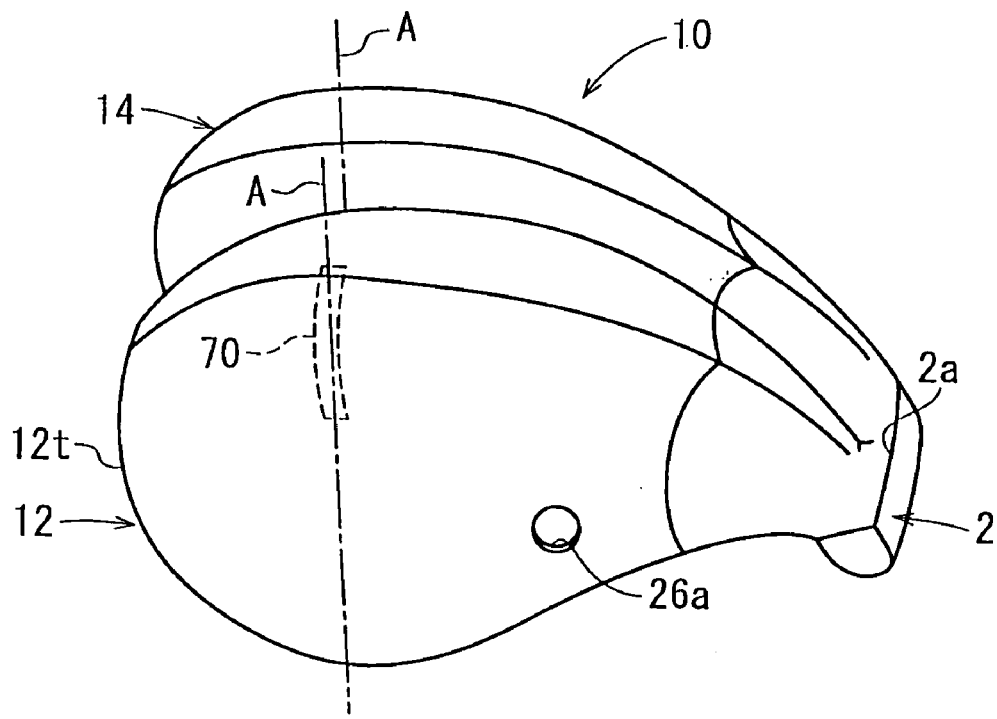
FIG. 4 is a perspective view showing a process of folding the airbag shown in FIG. 1(a)
Figure 5:
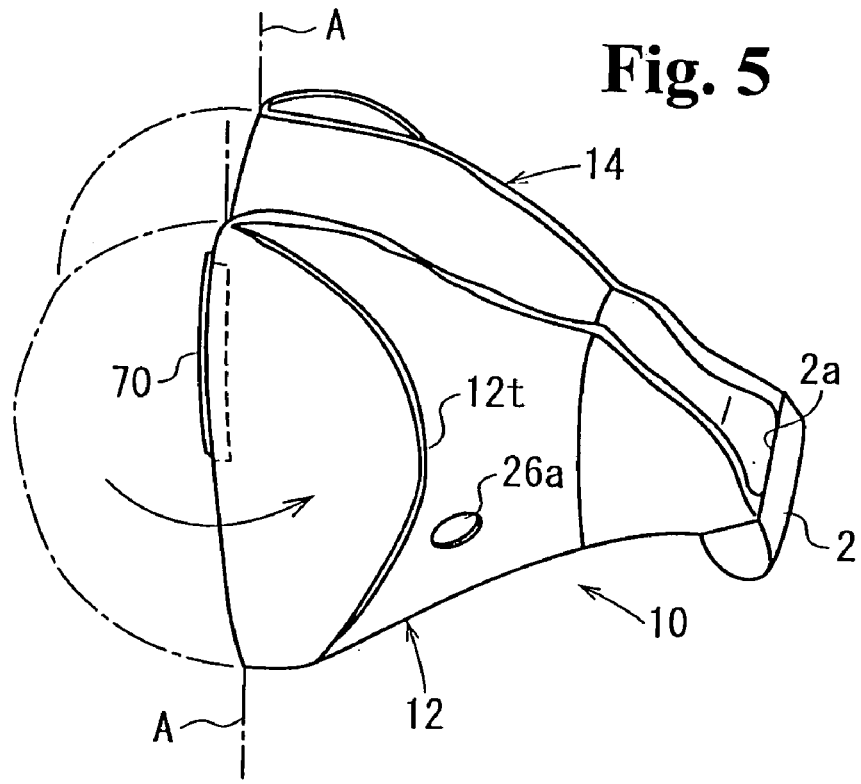
FIG. 5 is a perspective view showing the process of folding the airbag shown in FIG. 1(a)

As shown in FIG. 4, when the airbag 10 is unfolded, the opposing surfaces (connected with the connecting portion 70) of the right half airbag 12 and the left half airbag 14 are overlapped. As shown in FIG. 5, the airbag 10 is folded along fold lines A (first fold lines) along the connecting portion 70 such that distal portions of the right half airbag 12 and the left half airbag 14 from the connecting portion 70 move away from each other.

Figure 6:
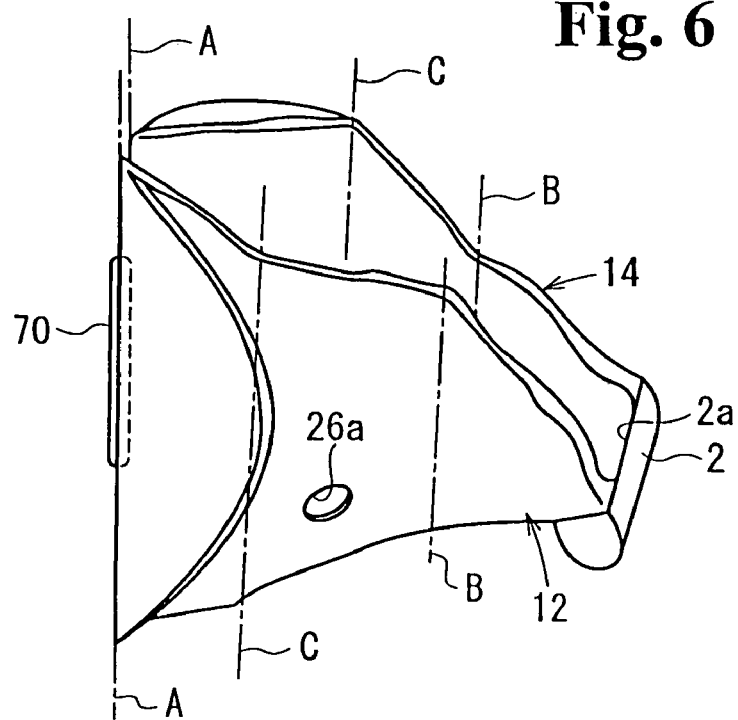
FIG. 6 is a perspective view showing the process of folding the airbag shown in FIG. 1(a)

As shown in FIG. 6, base portions of the right half airbag 12 and the left half airbag 14 from the fold lines A are folded along fold lines C (third fold lines) between the connecting portion 70 and the base portions of the right half airbag 12 and the left half airbag 14 such that the fold lines C move away from each other. That is, the right half airbag 12 and the left half airbag 14 are folded along fold lines B (second fold lines) between the fold lines C and the base portions thereof such that portions between the fold lines B and C move away from each other. At this time, the right half airbag 12 and the left half airbag 14 are folded along the fold lines C such that the portions between the fold lines C and A move away from each other.

Figure 7:
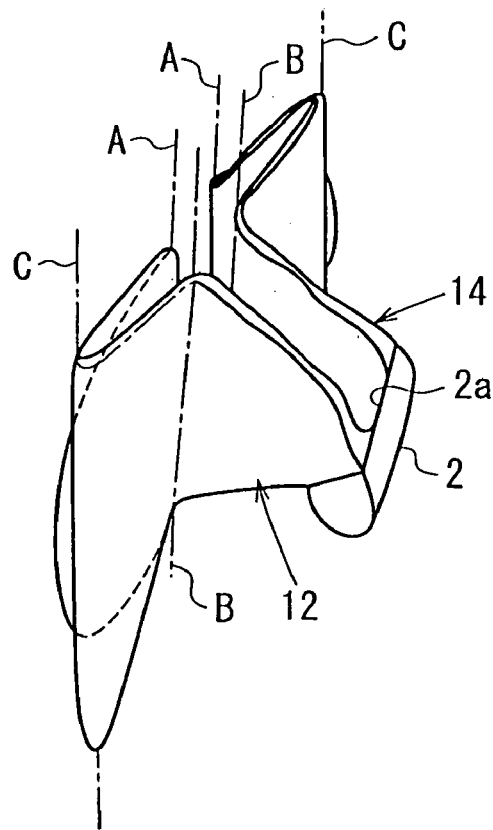
FIG. 7 is a perspective view showing the process of folding the airbag shown in FIG. 1(a)

The airbag 10 preferably has a distance from the rear end 10e to the fold lines B of about 20% to 40% of that from the rear end 10e to the connecting portion 70. The fold lines C lie midway between the fold lines B and A (the connecting portion 70). As shown in FIG. 7, the fold line A of the right half airbag 12 is overlapped with the fold line B thereof, and similarly, the fold line A of the left half airbag 14 is overlapped with the fold line B thereof. Also, portions between the fold lines B and C of the right half airbag 12 and the left half airbag 14 are overlapped with the portions between the fold lines C and A thereof, respectively.

Figure 8:
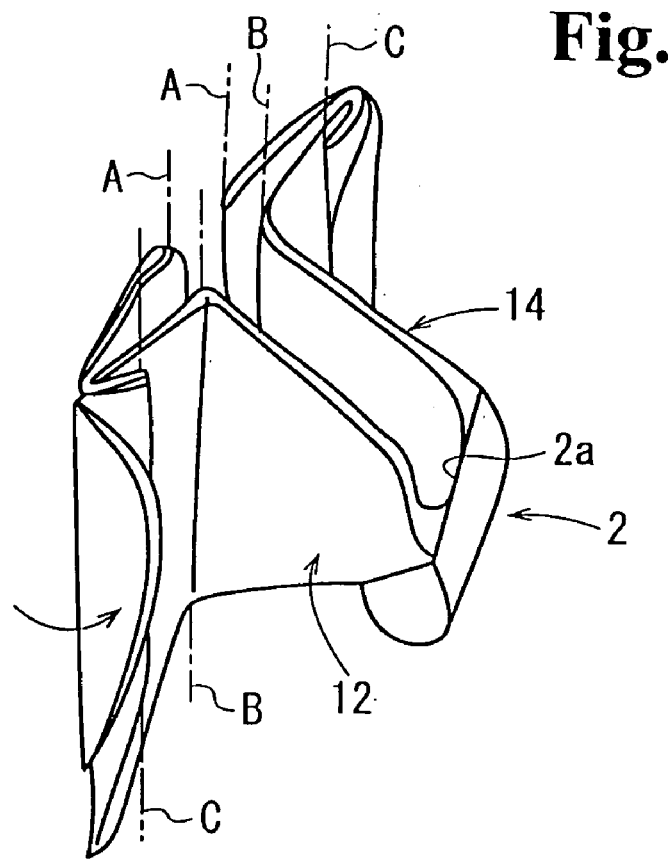
FIG. 8 is a perspective view showing the process of folding the airbag shown in FIG. 1(a)
Figure 9:
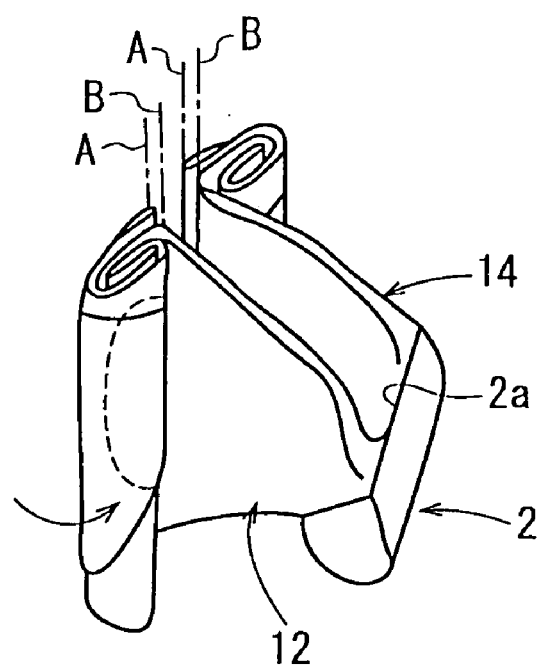
FIG. 9 is a perspective view showing the process of folding the airbag shown in FIG. 1(a)

As shown in FIGS. 8 and 9, the distal portions of the right half airbag 12 and the left half airbag 14 are rolled up from the fold lines C to A and B such that surfaces of the distal portions facing the base portions of the right half airbag 12 and the left half airbag 14 are rolled up. As shown in FIG. 12, when viewed from above, the distal portion of the right half airbag 12 is rolled up counterclockwise, while the distal portion of the left half airbag 14 is rolled up clockwise.

Figure 10:
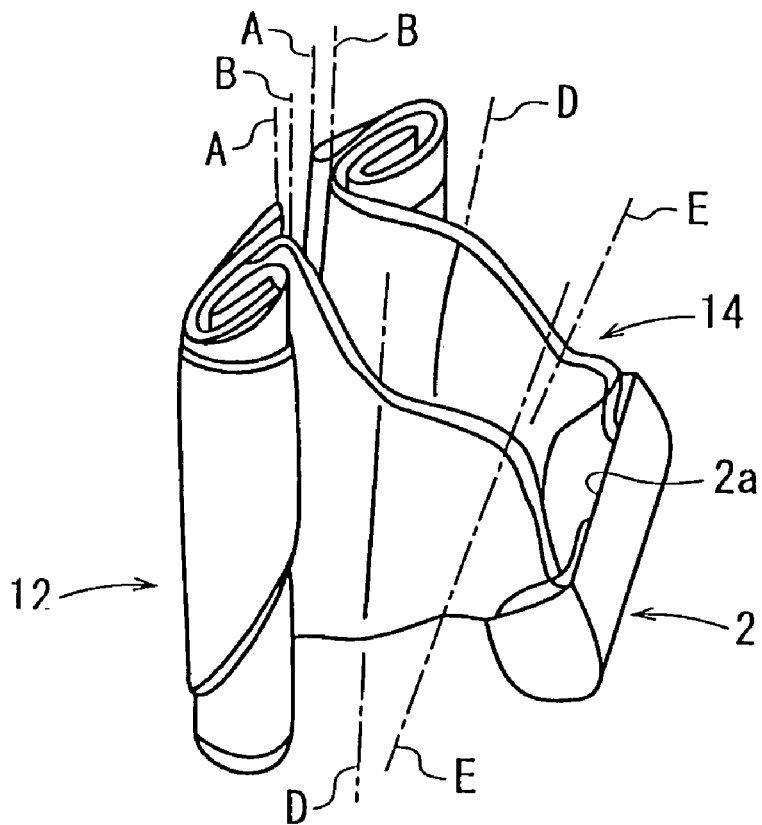
FIG. 10 is a perspective view showing the process of folding the airbag shown in FIG. 1(a)
Figure 11:
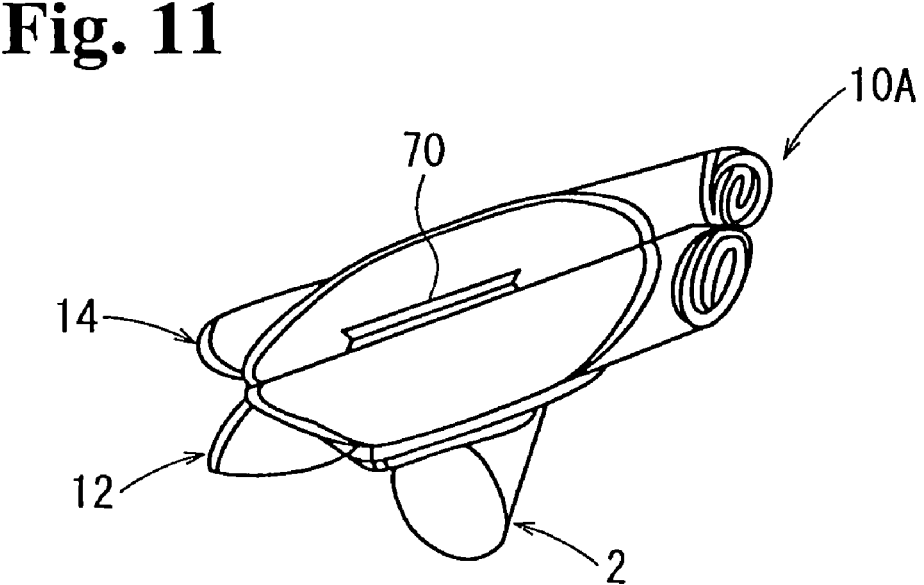
FIG. 11 is a perspective view showing the process of folding the airbag shown in FIG. 1(a)

As shown in FIGS. 9 and 10, the right half airbag 12 and the left half airbag 14 at the sides of the base portions from the fold lines B are folded into bellows (zigzag shape) along fold lines D and E between the fold lines B and the rear end 10e (not shown in FIGS. 9 and 10), and then are overlapped with a front opening 2a of the case 2. As shown in FIG. 11, the airbag 10A has primarily folded portions elongated vertically (substantially horizontally in FIG. 11).

The primary folded portions 10A are folded from the top and bottom ends thereof relative to the front opening 2a of the case 2, so that secondary folded portions are formed in a vertically compact state to become a finally folded airbag. The finally folded airbag is accommodated through the front opening 2a into the case 2. The case 2 is covered with the lid to close the front opening 2a. The top and bottom of the primary folded portion 10A may be rolled up or folded into bellows.

In the airbag device of the invention, in case of a vehicle collision, the gas from the inflator 56 flows through the communicating portion 16 into the right half airbag 12 and the left half airbag 14 to inflate the same at the front right and left sides of the occupant.

As described above, the airbag 10 is folded into the vertically elongated state to form the primary folded portions 10A, and is then secondarily folded into the finally folded airbag. Therefore, when the inflator 56 ejects the gas to the airbag, the right half airbag 12 and the left half airbag 14 are deployed from the secondary folded state, and are inflated vertically toward the occupant at a relatively initial stage of the inflation. As a result, a first contact area, i.e. an area of the airbag 10 that contacts the occupant first, is increased.

According to the embodiment, the distal portions of the right half airbag 12 and the left half airbag 14 are rolled up when the primary folded portions of the airbag 10 are formed. The right half airbag 12 is rolled up counterclockwise and the left half airbag 14 is rolled up clockwise when viewed from above. As a result, as shown in FIGS. 12 and 13, the airbag 10 is inflated such that the right half airbag 12 approaches and wraps the right side of the occupant thorax from the front right side of the occupant. The left half airbag 14 approaches and wraps the left side of the occupant thorax from the front left side of the occupant. As shown in FIGS. 14(a) and 14(b), the airbag 10 further wraps and receives the occupant head from the front left and right sides of the occupant.

According to the embodiment, the airbag 10 at the base portion sides from the fold lines B are folded into the bellows. Therefore, when the airbag 10 is inflated, the base portion sides are quickly inflated, and then the distal portions of the right half airbag 12 and the left half airbag 14 are inflated such that the distal portions wrap the occupant from the front left and right sides of the occupant.

In the airbag 10, when the right half airbag 12 and the left half airbag 14 are inflated from the folded state, one of the airbags 12 and 14 may be inflated faster than the other. In such a case, since the airbags 12 and 14 are connected with each other, the one of the airbags pulls the other of the airbags to facilitate the inflation of the airbags. Further, the right half airbag 12 and the left half airbag 14 are connected with the connecting portion 70 at the midsections thereof in the direction of the inflation. Therefore, the one of the airbags starts pulling the other of the airbags in the direction of the inflation from a relatively initial stage of the inflation. As a result, both the right half airbag 12 and the left half airbag 14 are inflated smoothly and substantially uniformly from the initial stage of the inflation.

Once the airbag 10 is completely inflated, the space 13 is formed between the distal ends of the right half airbag 12 and the left half airbag 14, and faces the occupant. The right half airbag 12 receives the right side of the occupant thorax, and the left half airbag 14 receives the left side of the occupant thorax. The space 13 faces the occupant around the breastbone, thereby reducing an impact around the breastbone.

A process of manufacturing the airbag 10 is as follows. As shown in FIG. 3(a), the seam 32 stitches the rear inner panel 18 and the front inner panel 22, and the seam 34 stitches the rear inner panel 18 and the front inner panel 24. The seam 36 stitches the rear outer panel 20 and the front outer panel 26, and the seam 38 stitches the rear outer panel 20 and the front outer panel 28. The seam allowances 44 between the rear inner panel 18 and the front inner panel 22 and the seam allowances 46 between the rear inner panel 18 and the front inner panel 24 are disposed outside the airbag in an assembled state.

As shown in FIG. 3(b), the seam 32 (32a and 32b) connects the rear inner panel 18 and the front inner panel 22 only at both ends of the seam allowance 44. An opening 60 is formed between the seams 32a and 32b for reversing the airbag.

A stitched assembly of the rear inner panel 18 and the front inner panels 22 and 24 and a stitched assembly of the rear outer panel 20 and the front outer panels 26 and 28 are overlapped with each other. At this time, surfaces to be exposed to the outside of the airbag face with each other. Then, edges of the stitched assemblies are stitched with the seams 30, 40, and 42, thereby obtaining an intermediate airbag product in a reversed state. The intermediate airbag product is reversed through the opening 60 in the seam allowance 44. The seams 52 then connect the joint allowances 48 and 50 at the seam allowances 44 and 46 to complete the airbag 10. When the joint allowances 48 and 50 are stitched, the seam 52 closes the opening 60.

As described above, although the airbag 10 has the large and complicated outer surface, it is possible to efficiently use a plurality of relatively small panels to form the airbag. In the embodiment, the seam allowance 44 between the rear inner panel 18 and the front inner panel 22 is joined to the seam allowance 46 between the rear inner panel 18 and the front inner panel 24, so that the right half airbag 12 and the left half airbag 14 are substantially connected. Thus, it is not necessary to use a tie panel in addition to the panels 18, 22, and 24 for connecting the right half airbag 12 and the left half airbag 14, thereby reducing a production cost of the airbag 10.

In the embodiment, the rear outer panel 20 of the communicating portion 16 has the pair of slits 54 for an inflator. The slits 54 hold the rod inflator 56 disposed in the communicating portion 16, thereby firmly attaching the airbag 10 to the inflator 56.

The intermediate airbag product may be difficult to reverse through a bent hole or openings for an inflator. In the embodiment, as described-above, the seam allowance 44 is provided with the opening 60 for reversing the airbag product. Therefore, it is easy to reverse the intermediate airbag product through the opening 60 even in the case that the slits are formed as the openings for the inflator. When the joint allowances 48 and 50 are stitched, the seams 52 close the opening 60. Therefore, the gas introduced into the right half airbag 12 and the left half airbag 14 from the inflator 56 does not leak through the opening 60.

Figure 17A:
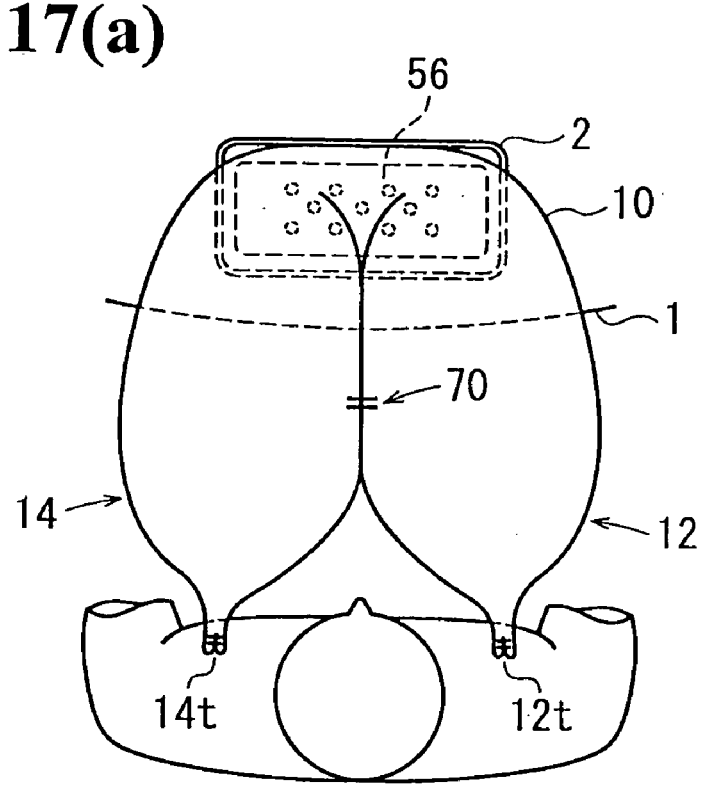
FIGS. 17(a) and 17(b) are plan views showing the process of inflating the airbag shown in FIG. 15.
Figure 17B:
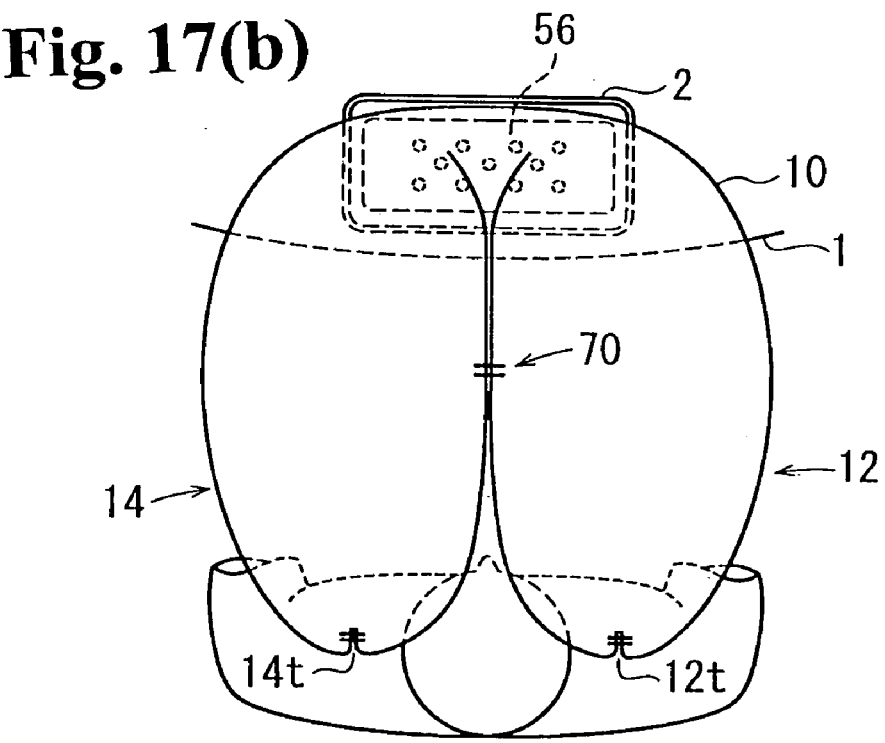

FIGS. 15 to 17(a) and 17(b) are views showing a process of inflating an airbag in an airbag device according to another embodiment. FIG. 17(a) shows a state that the distal ends of the left and right half airbags contact an occupant, and FIG. 17(b) shows the left and right half airbags in a completely inflated state.

According to the embodiment, when the airbag 10 is folded, instead of rolling up, the right half airbag 12 and the left half airbag 14 are folded into bellows from the base portions to the distal portions to form the primary folded portions elongated vertically. As shown in FIG. 15, the right half airbag 12 and the left half airbag 14 are folded into the bellows to form the primary folded portions of the airbag 10 in which distal ends 12t and 14t are directed in opposite directions.

Then, the airbag 10 is folded to form the secondary folded portions to obtain the final folded airbag to be accommodated in the case 2 of the airbag device. The other features of the airbag device are the same as those in FIGS. 1 to 11, and common reference numerals in FIGS. 1 to 11 represent the same components in FIGS. 15 to 17(a) and 17(b).

Also in this embodiment, the airbag device is installed on the instrument panel 1. The airbag 10 has the primary folded portions elongated vertically, which is then folded to form the secondary folded portions to obtain the final folded airbag. Therefore, when the inflator 56 ejects the gas to the airbag, the right half airbag 12 and the left half airbag 14 are released from the secondary folded portions, and are inflated vertically toward the occupant in a relatively early stage, thereby increasing the first contact area, i.e. the area of the airbag 10 contacting the occupant first.

In the embodiment, the right half airbag 12 and the left half airbag 14 are folded into the bellows from the base portions to the distal portions as the primary folded portions. Therefore, the right half airbag 12 and the left half airbag 14 are released from the secondary folded portions and inflated toward the occupant such that the right half airbag 12 and the left half airbag 14 receive the front left and right sides of the occupant thorax.

In the embodiment, the right half airbag 12 and the left half airbag 14 are folded to form the primary folded portions in which the distal ends 12t and 14t are directed in opposite directions. Therefore, as shown in FIG. 17(a), when the right half airbag 12 and the left half airbag 14 are inflated in the final stage (inflated up to the distal ends 12t and 14t), the distal ends 12t and 14t of the right half airbag 12 and the left half airbag 14 are inflated to approach the occupant head from the front left and right sides of the occupant, thereby wrapping and receiving the occupant head from the front left and right sides of the occupant.

Figure 18A:
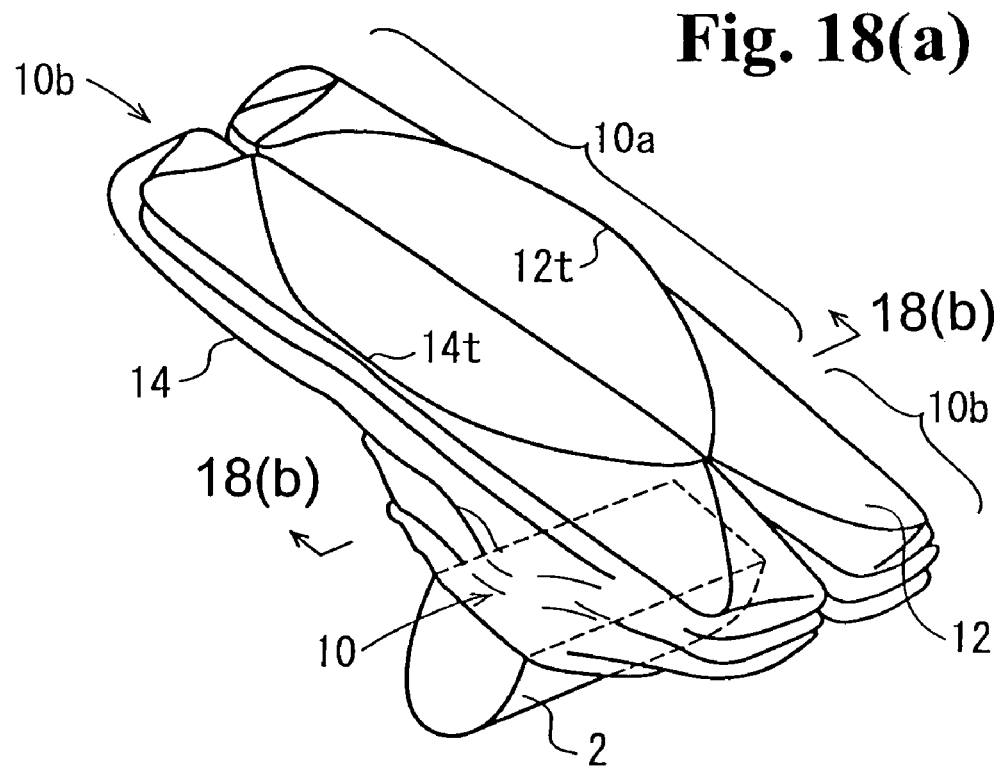

In the present invention, the top and bottom halves of the primarily folded portions may be folded separately to form the secondary folded portions. Accordingly, it is possible to adjust sizes of the top and bottom halves of the secondary folded portions. As shown in FIG. 18(a), for example, the airbag is folded to form primary folded portions 10B having top halves longer than bottom halves. The top halves and bottom halves are folded separately to form the secondary folded portions, so that the top halves of left and right half airbags can be inflated larger than the bottom halves thereof in the initial stage of the airbag inflation. As a result, the surfaces of the left and right half airbags face the occupant substantially vertically, thereby obtaining a large first contact area.

In the present invention, the folded airbag may have the bottom halves longer than the top halves, or may have the top and bottom halves having the same lengths, depending on an installing condition of the airbag device and the like.

Figure 19:
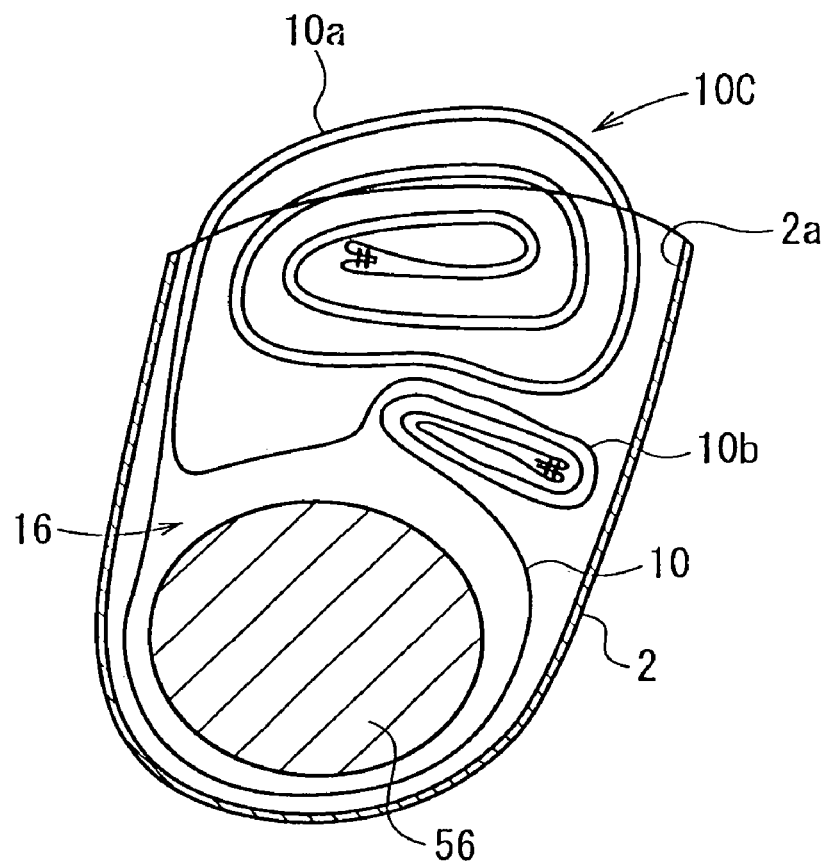
FIG. 19 is a sectional view of the airbag device shown in FIG. 18(a) in a final folded state.

When the secondary folded portions have the top halves longer than the bottom halves, it is preferable that the bottom halves are folded first, the top halves are folded next, and then the folded top halves are disposed on the folded bottom halves to complete a final folded airbag 10C as shown in FIG. 19. When such an airbag is inflated, the bottom halves are inflated to push up the top halves, thereby facilitating the inflation of the top halves.

Figure 18B:
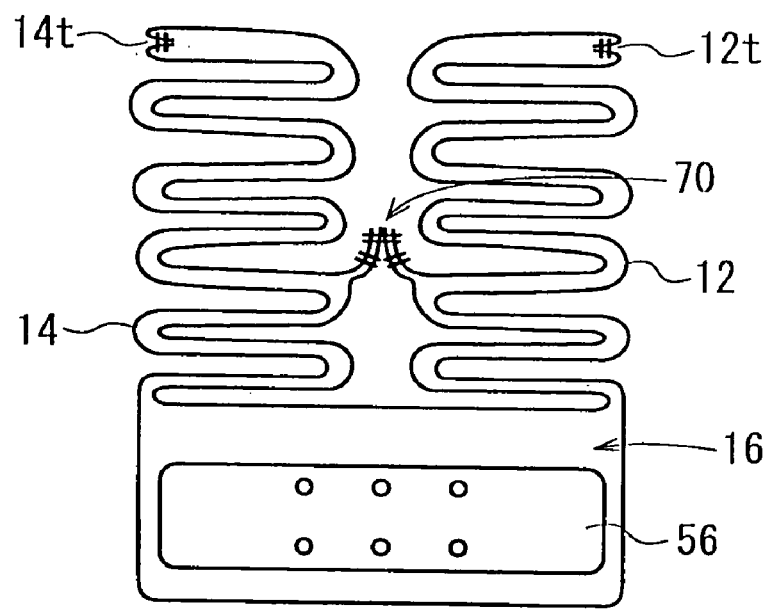

FIG. 18(a) is a perspective view of the primary folded portions 10B having the top halves longer than the bottom halves, and FIG. 18(b) is a sectional view taken along line 18(b)—18(b) in FIG. 18(a). FIG. 19 is a sectional view of the final folded airbag 10C in which the primary folded portions 10B are folded such that the top halves are disposed on the bottom halves.

In the airbag 10 shown in FIGS. 18(a), 18(b) and 19, the inflator 56 is disposed in the communicating portion 16 at the bottom of the airbag 10, and a bottom end of the communicating portion 16 and the inflator 56 are connected with the case 2.

In the embodiment, in a state that the right half airbag 12 and the left half airbag 14 are unfolded in a flat state with side surfaces thereof overlapped, the right half airbag 12 and the left half airbag 14 are folded into bellows from the tops to the bottoms to form the primarily folded portions 10B elongated vertically (substantially horizontally in FIG. 18(a)). In this case, the case 2 is disposed below a center of the primary folded portions 10B in the vertical direction such that each of the primary folded portions 10B has a top half 10a (to be folded) longer than a bottom half 10b. The primary folded portions 10B preferably have the top halves 10a 1.5 to 2.5 times longer than the bottom halves 10b.

The right half airbag 12 and the left half airbag 14 are folded into the primary folded portions 10B in which the top ends 12t and 14t are directed in opposite directions.

The bottom halves 10b are rolled up first, the top halves 10a are rolled up next, and then the rolled-up top halves 10a are disposed on the rolled-up bottom halves 10b to complete the final folded airbag 10C. The bottom halves 10b are rolled up such that the rear surfaces (facing the case 2) of the bottom halves 10b are rolled up, while the top halves 10a are rolled up such that the front surfaces (facing away from the case 2) of the top halves 10a are rolled up. Accordingly, the bottom halves 10b are inflated while pressing the folded top halves 10a, and the top halves 10a are smoothly inflated without hitting a vehicle component such as a windshield (not shown).

In the embodiment, the final folded airbag 10C is accommodated into the case 2, and the front opening 2a of the case 2 is closed with a cover such as a lid (not shown). The other features of the airbag device is the same as those in FIGS. 1 to 3, and common reference numerals in FIGS. 1 to 3 and FIGS. 18 and 19 represent the same components.

In the airbag device, the airbag 10 is folded into a vertically elongated shape, i.e. the primary folded portions 10B, and the primary folded portions 10B are folded to form the secondary folded portions to be the final folded airbag 10C. Therefore, when the inflator 56 supplies the gas into the final folded airbag 10C, the right half airbag 12 and the left half airbag 14 are released from the secondary folded portions vertically toward the occupant in a relatively initial stage. Accordingly, it is possible to increase the first contact area, i.e. the area of the airbag 10 contacting the occupant first.

In the airbag device, when the final folded airbag 10C is inflated, the top halves 10a and bottom halves 10b of the airbag 10 are inflated while the folded bottom halves 10b disposed under the top halves 10a pushes up the top halves 10a, thereby facilitating the inflation of the top halves 10a. The airbag 10 is folded to form the primary folded portions such that the top halves 10a are longer than the bottom halves 10b. Accordingly, it is possible to inflate the top halves 10a larger than the bottom halves 10b in the initial stage of the airbag inflation. As a result, the surfaces of the right half airbag 12 and the left half airbag 14 face the occupant substantially vertically, thereby increasing the first contact area.

In the embodiment, the right half airbag 12 and the left half airbag 14 are folded into the bellows from the bottoms to the tops to form the primary folded portions. Therefore, the right half airbag 12 and the left half airbag 14 are released from the secondary folded portions toward the occupant such that the right half airbag 12 and the left half airbag 14 receive the front left and front right sides of the occupant thorax. The right half airbag 12 and the left half airbag 14 are folded to form the primary folded portions in which the top ends 12t and 14t are directed in opposite directions. Therefore, when the right half airbag 12 and the left half airbag 14 are inflated to the final stage, the top ends 12t and 14t of the right half airbag 12 and the left half airbag 14 are inflated to approach the occupant head from the front left and front right sides of the occupant, thereby allowing the airbag 10 to wrap and receive the occupant head.

It is possible to fold the airbag with a method other than the methods described above to form the primary folded portion such that the top half is longer than the bottom half. It is also possible to separately fold the top and bottom halves of the primary folded portion with a method other than the methods described above.

The present invention is not limited to the embodiments shown in the drawings. For example, the right half airbag 12 and the left half airbag 14 communicate with each other at the bottom. Alternatively, both airbags may be separated. In addition, the right half airbag and the left half airbag may be inflated with different inflators. Furthermore, the midsections of the right half airbag and the left half airbag may be connected by, for example, a panel, a string, or a net. In the present invention, the right half airbag and the left half airbag may be symmetric or asymmetric. In addition, the right half airbag and the left half airbag may have the same volume or different volumes.

Figure 20:
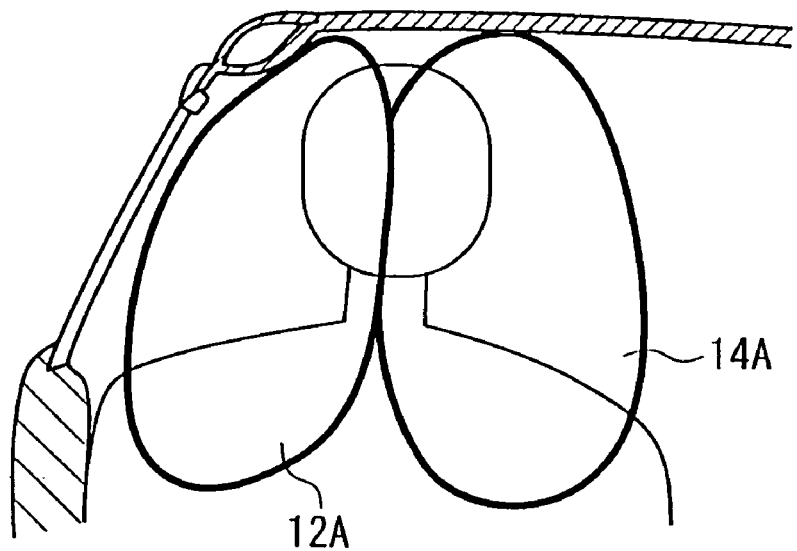
FIG. 20 is a view showing an airbag according to a still further embodiment.

As shown in FIG. 20, in the present invention, a top portion of the airbag adjacent to an A pillar (a right half airbag 12A in FIG. 20) may be inclined inwardly so as not to touch the A pillar, a windshield, or a side window.

Figure 21:
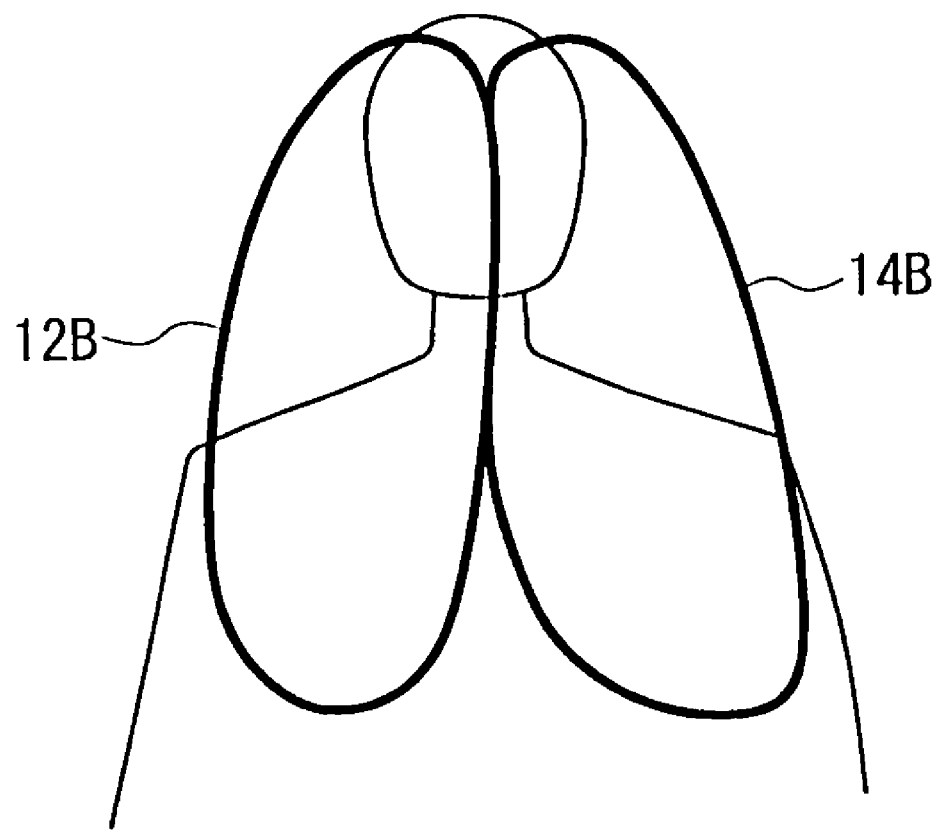
FIG. 21 is a view showing an airbag according to a still further embodiment.

As shown in FIG. 21, in the present invention, the airbags (the right half airbag 12B and a left half airbag 14B) may have top portions having horizontal widths gradually decreasing in an upward direction.

Figure 22A:
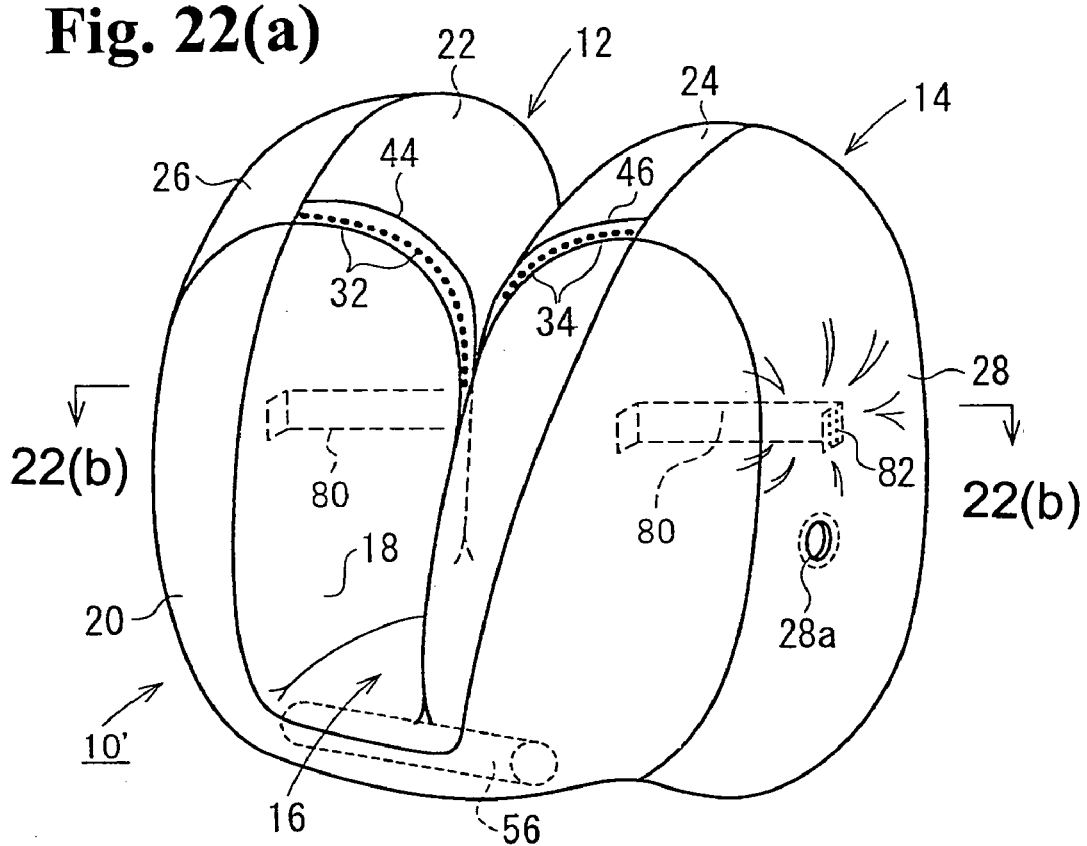
Figure 22B:
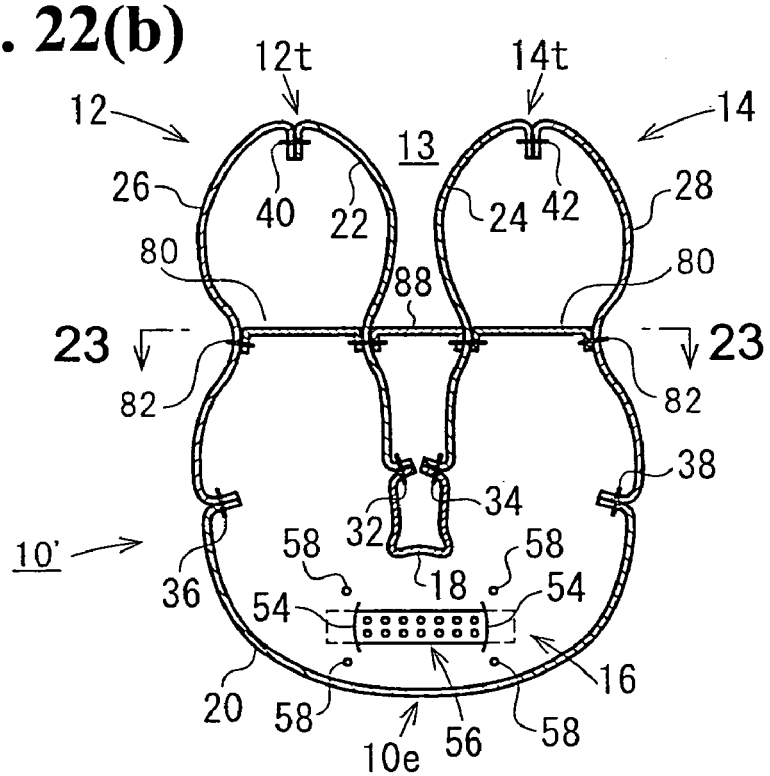
Figure 23:
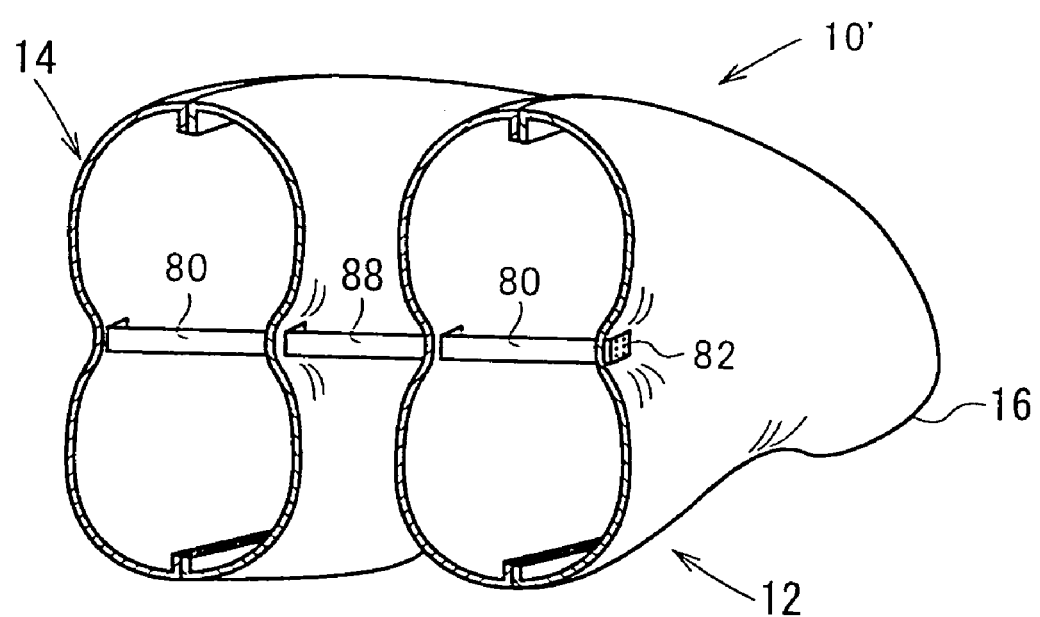
FIG. 23 is a sectional view of the airbag taken along line 23—23 in FIG. 22(b)

An airbag 10' of a still further embodiment of the present invention will be described with reference to FIGS. 22(a), 22(b) and 23. FIG. 22(a) is a perspective view of the airbag 10' according to the embodiment in an inflated state, and FIG. 22(b) is a sectional view taken along line 22(b)—22(b) in FIG. 22(a). FIG. 23 is a sectional view of the airbag taken along line 23—23 in FIG. 22(a).

In the airbag 10', a belt 82 is provided as width restricting means in each of the left and right half airbags 12 and 14 for restricting the widths of the left and right half airbags in a left-to-right direction when the airbag is inflated. The belt 80 connects the front inner panel 22 and the front outer panel 26 constituting left and right surfaces of the right half airbag 12, and the belt 80 connects the front inner panel 24 and the front outer panel 28 constituting left and right surfaces of the left half airbag 14, respectively. Both ends of the belts 80 are joined to the respective panels 22, 24, 26 and 28 with seams 82.

In the airbag 10', a connecting belt 88 connects opposing portions of the left and right half airbags 12 and 14 as a panel shaped connecting member. Both ends of the connecting belt 88 are joined to the left and right half airbags 12 and 14 by sewing.

In this embodiment, when the airbag 10' is inflated, the belts 80 in the left and right half airbags 12 and 14 are arranged linearly with the connecting belt 88. Accordingly, the left and right half airbags 12 and 14 are inflated without distortion, and the left and right half airbags 12 and 14 are securely inflated in predetermined shapes.

In this embodiment, the tongue shaped joint allowances 48 and 50 shown in FIG. 1(a) and FIG. 2 are omitted, and the left and right half airbags 12 and 14 are not connected around the seams 32 and 34. Other features of the airbag 10' are same as those of the airbag 10 shown in FIGS. 1(a), 1(b) to 3, and the same reference numerals denote the same components.

A passenger airbag device having the airbag 10' is mounted on an upper surface of an instrumental panel of a vehicle. When the airbag 10' is fully inflated (in a state that an occupant does not contact the airbag), the connecting belt 88 is preferably located at a position away from a rear edge of the instrumental panel by a horizontal distance of 200 to 230 mm. The connecting belt 88 is also preferably located at a position away from a seating surface of a passenger seat by a vertical distance less than 500 mm, for example, between 400 and 500 mm.

The belts 80 and the connecting belt 88 preferably have a vertical width of 100 to 140 mm, for example, about 120 mm. When the belts 80 and the connecting belt 88 are joined to the left and right half airbags 12 and 14, a distance between the upper most sewing line and the lower most sewing line is preferably about 90 mm.

As shown in FIGS. 22(a), 22(b) and 23, the belts 80 and the connecting belt 88 are disposed so that belt surfaces thereof are aligned in a vertical direction. With this configuration, as compared with a case that the belt surfaces are aligned in a horizontal direction, it is possible to reduce stresses generated at connecting portions of the belts 80 and the connecting belt 88 when the airbag 10' is inflated in an early stage.

Figure 24A:
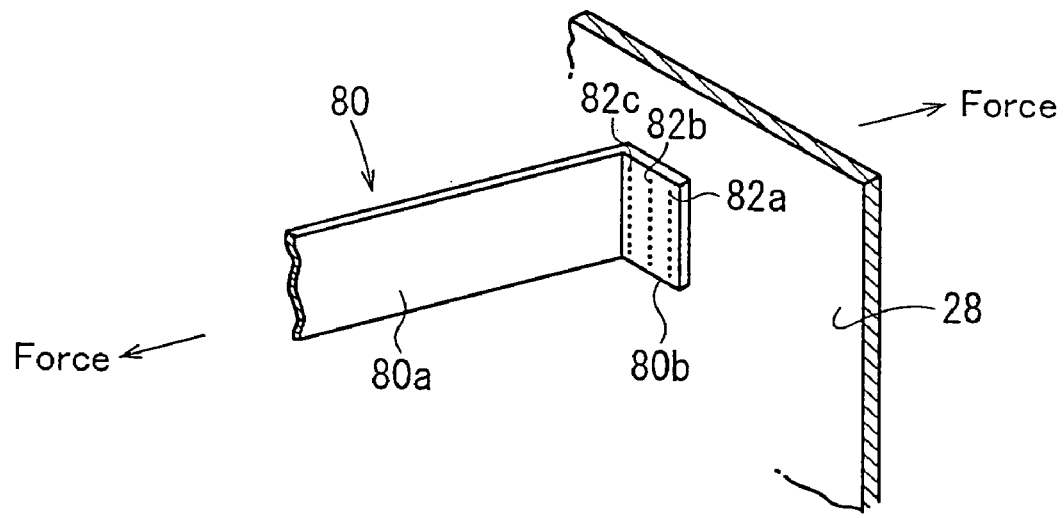

The reason will be explained with reference to FIGS. 24(a) and 24(b). FIG. 24(a) is a view of the embodiment showing a case that the belt has the surface in a vertical direction, and FIG. 24(b) is a comparative view showing a case that the belt has a surface in a horizontal direction.

The belt 80 includes a main body 80a and a joint allowance 80b at an end thereof. The joint allowance 80b is sewn to the panel 28 with sewing threads 82 (82a, 82b and 82c). The sewing threads 82a to 82c are machine sewing lines extending in parallel to a belt surface of the main body. The threads 82a are located at the furthermost position from the main body 80a, and the threads 82c are located at the closest position from the main body 80a. The threads 82b are located in between.

When the airbag 10' is inflated, generally the airbag 10' starts inflating from the base portion, i.e. the inflator side. At the moment the belts 80 in the airbags 12 and 14 fully extend along with the inflation of the airbag, moving inertia in a sideway of the panel 28 is applied to the joining portion of the belt 80 and the panel 28 all at once, thereby generating a large force applied to the joining portion.

Figure 24B:
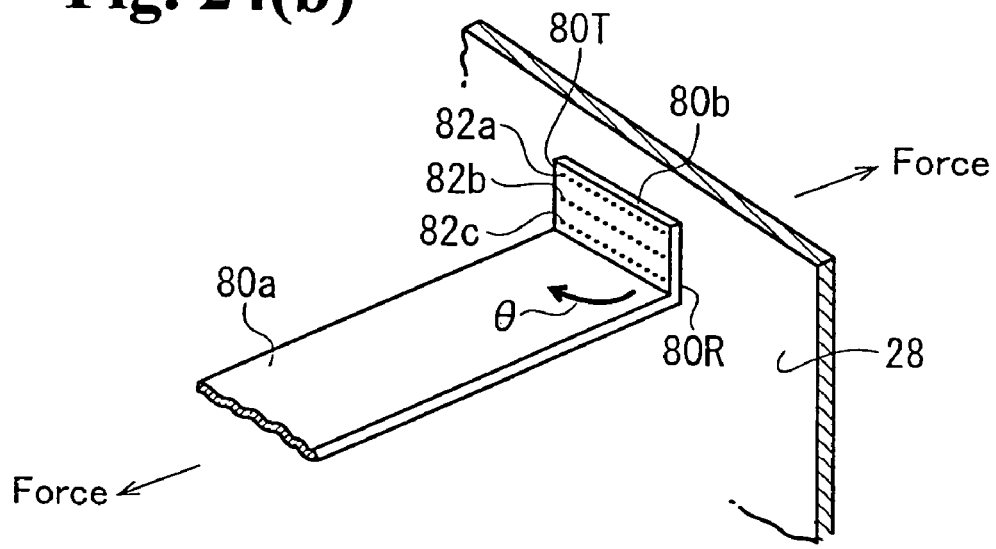

When the belt has the surface in a horizontal direction as shown in FIG. 24(b), the force is first applied to the threads close to an edge portion 80R at the base end of the airbag among the threads 82a to 82c, and then applied to an edge portion 80T at the distal end side of the airbag. At the moment when the force is applied to the edge portion 80R, the force is applied locally only to an R side of the joint allowance 80b. Accordingly, a portion of the joint allowance 80b at a side of the edge portion 80R is pulled in a direction θ. Therefore, it is necessary to provide a strong joint at the side of the edge portion 80R to support the local force.

On the other hand, when the belt has the surface in a vertical direction as shown in FIG. 24(a), the threads 82a to 82c support the force as a whole upon applying the force to the joint allowance. Since the force is distributed among the threads, the threads 82a to 82c can be made simple as opposed to the case in FIG. 24(b).

FIG. 24(a) is a view showing the belt 80 and the panel 28. Similarly, the belts 80 are joined to the panel 22, 24 and 26 in the same way. Further, the connecting belt 88 is joined to the panels 22 and 24 in the same way. When the surfaces of the belts are aligned in the vertical direction, it is possible to simplify a process of joining the belts 80 and the connecting belt 88.

When the surfaces of the belts are aligned in the vertical direction, it is possible to set the fold line A along the belt surface when the airbags 12 and 14 are folded along the fold line A as shown in FIG. 6, thereby making it easy to fold. That is, the airbags 12 and 14 are easily folded along the belt surfaces at precise positions.

Figure 25:
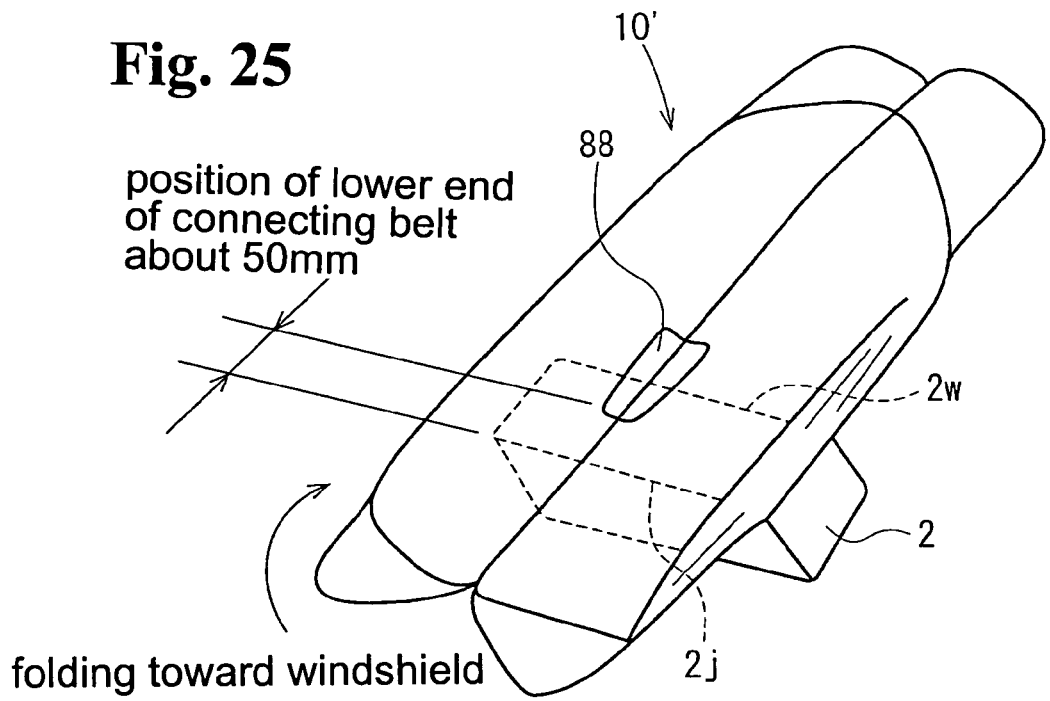
FIG. 25 is a perspective view showing a process of folding the airbag shown in FIG. 22(a)

A process of folding the airbag 10' will be explained with reference to FIGS. 25 to 31. A process of folding the primary folded portion of the airbag 10' is same as that shown in FIGS. 4 to 11. FIG. 25 is a perspective view showing the primary folded portion of the airbag 10'. As shown in FIG. 25, a distance between a lower end of the connecting belt 88 and a passenger side 2j of the case 2 is preferably about 50 mm (for example, 40 to 60 mm).

Figure 26:
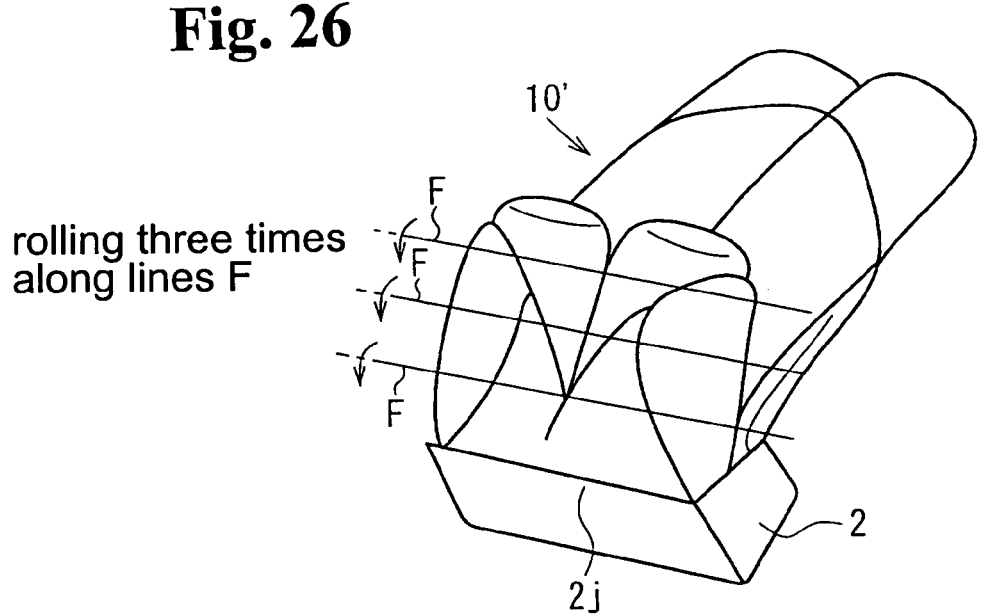
FIG. 26 is a perspective view showing the process of folding the airbag shown in FIG. 22(a)
Figure 27:
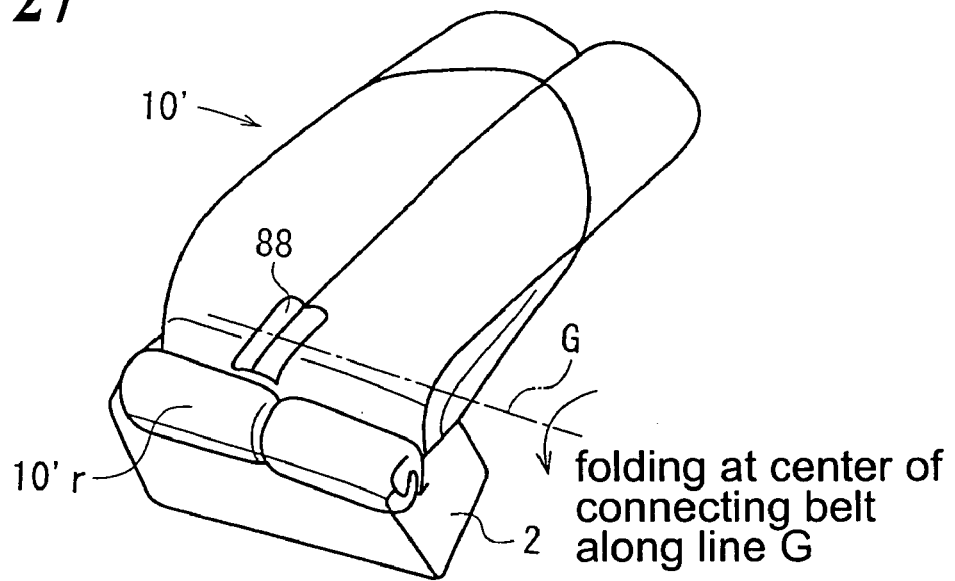
FIG. 27 is a perspective view showing the process of folding the airbag shown in FIG. 22(a)
Figure 28:
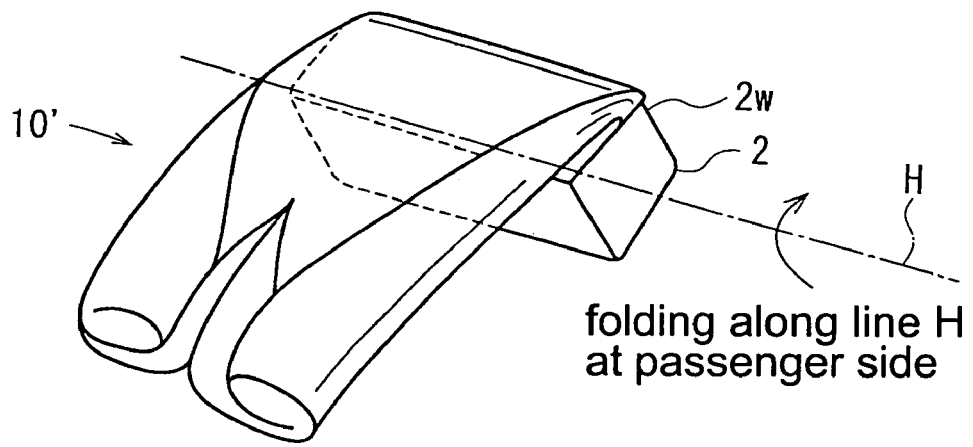
FIG. 28 is a perspective view showing the process of folding the airbag shown in FIG. 22(a)

As shown in FIGS. 25 and 26, the primary folded portion is folded toward the windshield along the passenger side 2j of the case 2. Then, as shown in FIGS. 26 and 27, a passenger side of the primary folded portion is rolled three times along the fold lines F to form a rolled portion 10'r. Then, as shown in FIGS. 27 and 28, a windshield side of the primary folded portion is folded toward the passenger side along a fold line G passing through the center of the connecting belt 88. Further, as shown in FIGS. 28 and 29, the primary folded portion is folded along a fold line H along the passenger side 2j of the case 2.

Figure 29:
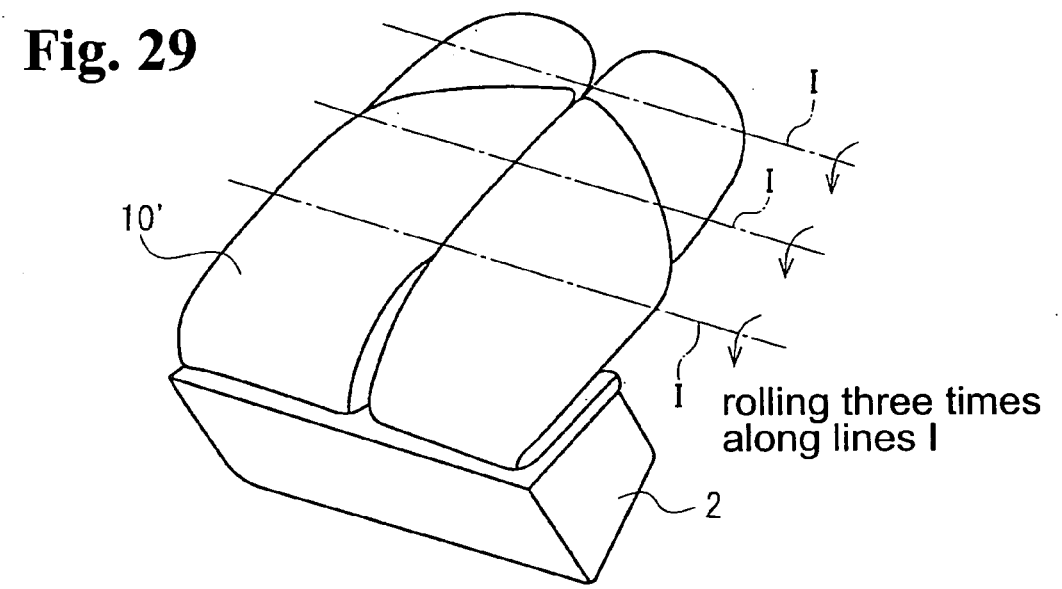
FIG. 29 is a perspective view showing the process of folding the airbag shown in FIG. 22(a)
Figure 30:
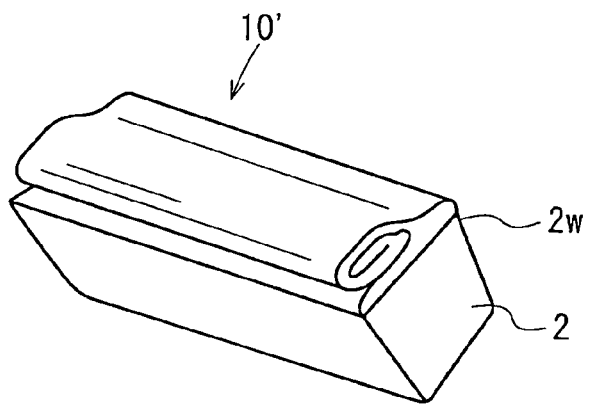
FIG. 30 is a perspective view showing the process of folding the airbag shown in FIG. 22(a)
Figure 31:
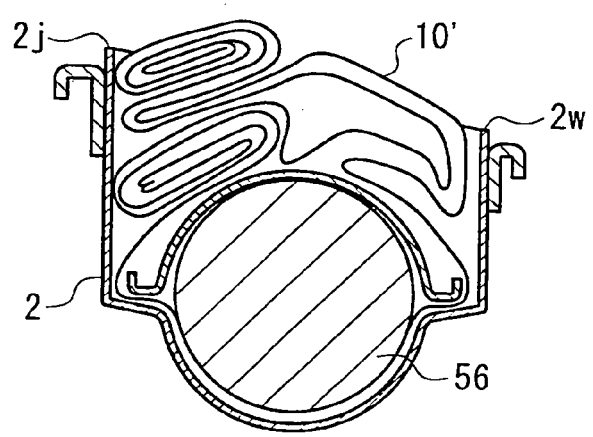
FIG. 31 is a perspective view showing the process of folding the airbag shown in FIG. 22(a).

Then, as shown in FIGS. 29 and 30, the windshield side of the primary folded portion is rolled three times along fold lines I, and the airbag is retained in the case as shown in FIG. 31. The lid is attached to the case. The airbag 10' folded in this way has the symmetrical folded state in left and right sides. The process of folding the airbag shown in FIGS. 25 to 30 is just an example, and the airbag may be folded in a different way.

As described above, the present invention provides the airbag device having the left and right half airbags with a large first contact area relative to the occupant. In addition, the present invention provides the airbag and the airbag device in which the left half airbag receives the left side of the occupant thorax, the right half airbag receives the right side of the occupant thorax, and the space between the both airbags faces the occupant around the breastbone. Furthermore, the present invention provides the airbag and the airbag device in which both the left and right half airbags are inflated smoothly and substantially uniformly from the initial stage of the inflation.

While the invention has been explained with reference to the specific embodiments of the invention, the explanation is illustrative and the invention is limited only by the appended claims.

What is claimed is:

1. An airbag device for protecting an occupant, comprising;
    an airbag including a left half airbag to be inflated at a left side of the occupant and having a distal end and a base portion, and a right half airbag to be inflated at a right side of the occupant and having a distal end and a base portion, said distal ends of the left and right half airbags being separated from each other to form a space therebetween facing the occupant when the airbag is inflated, each of the left and right half airbags having a belt for connecting panels of each of the left and right half airbags for restricting a horizontal width thereof when the airbag is inflated, said left and right half airbags having primary folded portions in which each of the left and right half airbags is folded laterally and partly overlapped between the distal end and the base portion to have an elongated vertical form, and secondary folded portions in which the elongated vertical form in each of the left and right half airbags is folded to reduce an elongated distance thereof to form a final folded state, and
    an inflator for inflating the airbag.

2. An airbag device according to claim 1, wherein said primary folded portions have a left rolled up portion at the left half airbag rolled up clockwise viewed from above, and a right rolled up portion at the right half airbag rolled up counterclockwise viewed from above.

3. An airbag device according to claim 1, wherein said primary folded portions have portions folded in bellows.

4. An airbag device according to claim 1, wherein said primary folded portions have top and bottom halves to be folded separately to form the secondary folded portions, respectively.

5. An airbag device according to claim 4, wherein said primary folded portions have the top halves larger than the bottom halves.

6. An airbag device according to claim 1, wherein said base portions of the left and right half airbags are connected together, said inflator inflating the left and right half airbags.

7. An airbag device according claim 1, wherein said left and right half airbags have opposing surfaces connected with each other with connecting portions at midsections thereof in a direction that the airbag is inflated.

8. An airbag device according to claim 7, wherein said left and right half airbags have distal portions from the connecting portions to the distal ends thereof folded in opposite directions along first fold lines extending along the connecting portions in a vertical direction, middle portions between the first fold lines and second fold lines situated between the first fold lines and the base portions of the left and right half airbags, said middle portions being folded along third fold lines extending in a middle of the middle portions in the vertical direction such that the third fold lines move away from each other, said distal and middle portions being overlapped and rolled, and base sides between the second fold lines and the base portions folded into bellows.

9. An airbag device according to claim 1, wherein at least one of said left half airbag and said right half airbag includes an inclined upper portion.

10. An airbag device according to claim 1, wherein at least one of said left half airbag and said right half airbag includes a portion having a thickness gradually decreasing upwardly when the left half airbag and the right half airbag are inflated.

11. An airbag device according to claim 1, wherein said distal ends of the left half airbag and the right half airbag are separated by a distance of 150–450 mm when the left half airbag and the right half airbag are deployed.

12. An airbag device according to claim 1, further comprising a connecting belt for connecting opposing portions of the left half airbag and the right half airbag at midsections thereof in a direction that the airbag is inflated, said connecting belt extending in a direction to connect the left half airbag and the right half airbag and being arranged linearly with the belts for connecting the panels when the airbag is inflated.

13. An airbag device according to claim 12, wherein said belts for connecting the panels have surfaces aligned vertically and positioned on a plane where a surface of the connecting belt is located when the airbag is inflated.

14. An airbag for protecting an occupant, comprising:
a left half airbag to be inflated at a left side of the occupant and having a distal end and a base portion, said left half airbag being formed of a plurality of panels connected together,
a right half airbag to be inflated at a right side of the occupant and having a distal end and a base portion, said right half airbag being formed of a plurality of panels connected together, said distal ends of the left and right half airbags being separated from each other to form a space therebetween facing the occupant when the airbag is inflated, and
belts disposed in the left half airbag and the right half airbag for connecting the panels of each of the left half airbag and the right half airbag to restrict a horizontal width of each of the left half airbag and the right half when the airbag is inflated, each belt having a surface aligned vertically when the airbag is inflated.

15. An airbag for protecting an occupant, comprising:
a left half airbag to be inflated at a left side of the occupant and having a distal end and a base portion,
a right half airbag to be inflated at a right side of the occupant and having a distal end and a base portion, said distal ends of the left and right half airbags being separated from each other to form a space therebetween facing the occupant when the airbag is inflated,
belts disposed in the left half airbag and the right half airbag for connecting panels of each of the left half airbag and the right half airbag to restrict a horizontal width of each of the left half airbag and the right half airbag when the airbag is inflated, each belt having a surface aligned vertically when the airbag is inflated, and
a connecting belt for connecting opposing portions of the left half airbag and the right half airbag at midsections thereof in a direction that the airbag is inflated, said connecting belt extending in a direction to connect the left half airbag and the right half airbag.

16. An airbag according to claim 15, wherein said connecting belt is arranged linearly with the belts for connecting the panels and has a surface positioned on a plane where the surfaces of the belts for connecting the panels are located when the airbag is inflated.

17. An airbag device comprising the airbag according to claim 15, and an inflator.

18. An airbag device comprising the airbag according to claim 14, and an inflator.

* * * * *